US008747269B2

(12) United States Patent
Mattsson et al.

(10) Patent No.: US 8,747,269 B2
(45) Date of Patent: Jun. 10, 2014

(54) CONTINUOUSLY VARIABLE TRANSMISSION AND A WORKING MACHINE INCLUDING A CONTINUOUSLY VARIABLE TRANSMISSION

(75) Inventors: Per Mattsson, Hindås (SE); Mats Akerblom, Eskilsluna (SE)

(73) Assignee: Volvo Contruction Equipment AB, Eskilstuna (SE)

( * ) Notice: Subject to any disclaimer, the term of this patent is extended or adjusted under 35 U.S.C. 154(b) by 0 days.

(21) Appl. No.: 13/810,526

(22) PCT Filed: Jul. 16, 2010

(86) PCT No.: PCT/SE2010/000194
§ 371 (c)(1),
(2), (4) Date: Jan. 23, 2013

(87) PCT Pub. No.: WO2012/008884
PCT Pub. Date: Jan. 19, 2012

(65) Prior Publication Data
US 2013/0123055 A1     May 16, 2013

(51) Int. Cl.
*F16H 47/04*     (2006.01)

(52) U.S. Cl.
USPC ........................................................ 475/73

(58) Field of Classification Search
CPC ...... F16H 47/04; F16H 2047/045; F16H 3/72
See application file for complete search history.

(56) References Cited

U.S. PATENT DOCUMENTS

| 3,470,769 | A | * | 10/1969 | Livezey | 475/24 |
| 4,291,592 | A | * | 9/1981 | Meyerle et al. | 475/81 |
| 4,823,640 | A | * | 4/1989 | Donnelly | 475/75 |

(Continued)

FOREIGN PATENT DOCUMENTS

| DE | 4236671 C1 | 11/1993 |
| DE | 4323358 C3 | 5/1994 |

(Continued)

OTHER PUBLICATIONS

DE106431 (Aug. 27, 1959) with machine translation.

(Continued)

*Primary Examiner* — Dirk Wright
(74) *Attorney, Agent, or Firm* — WRB-IP LLP

(57) ABSTRACT

A continuously variable transmission includes a variator unit having a variator input shaft and a variator output shaft, and first, second and third planetary gear sets. The first and second planetary gear sets are arranged together and each includes a first member operatively connected to a common transmission input shaft and a second member operatively connected to a common output shaft, each of the first and second planetary gear sets further including a third member. The third planetary gear set has a first, second and third member. The variator input shaft is operatively connected to the third member of the second planetary gear set and the variator output shaft is operatively connected to the third member of the first planetary gear set. The first member of the third planetary gear set is operatively connected to the variator output shaft. The second member of the third planetary gear set is selectively connectable to the third member of the second planetary gear set and selectively connectable to the transmission housing. The third member of the third planetary gear set is operatively connected to a transmission output shaft. The common output shaft is selectively connectable to the transmission output shaft.

20 Claims, 20 Drawing Sheets

(56) References Cited

U.S. PATENT DOCUMENTS

| | | | |
|---|---|---|---|
| 5,980,410 A | 11/1999 | Stemler et al. | |
| 6,761,658 B1* | 7/2004 | Stettler, Jr. | 475/73 |
| 7,121,970 B2* | 10/2006 | Funato et al. | 475/78 |
| 7,241,242 B2* | 7/2007 | Schmidt | 475/72 |
| 8,206,253 B2* | 6/2012 | Lindsay et al. | 475/73 |
| 2006/0094554 A1 | 5/2006 | Schmidt | |
| 2006/0154771 A1 | 7/2006 | Klemen | |
| 2006/0276290 A1 | 12/2006 | Fabry et al. | |
| 2006/0276291 A1 | 12/2006 | Fabry et al. | |
| 2007/0099738 A1 | 5/2007 | Holmes | |
| 2009/0020004 A1 | 1/2009 | Gollner | |
| 2009/0275437 A1 | 11/2009 | Kersting | |
| 2012/0178565 A1* | 7/2012 | Fischer et al. | 475/1 |
| 2012/3002389 | 11/2012 | Fischer et al. | |

FOREIGN PATENT DOCUMENTS

| | | |
|---|---|---|
| DE | 19757329 A1 | 6/1999 |
| DE | 102005030420 A1 | 1/2007 |
| DE | 102007035307 A1 | 1/2009 |
| GB | 2407853 A | 5/2005 |

OTHER PUBLICATIONS

International Search Report (Mar. 29, 2011) for corresponding International application No. PCT/SE2010/000194.

Supplementary European Search Report (Mar. 21, 2014) for corresponding European App. EP 10 85 4793.

* cited by examiner

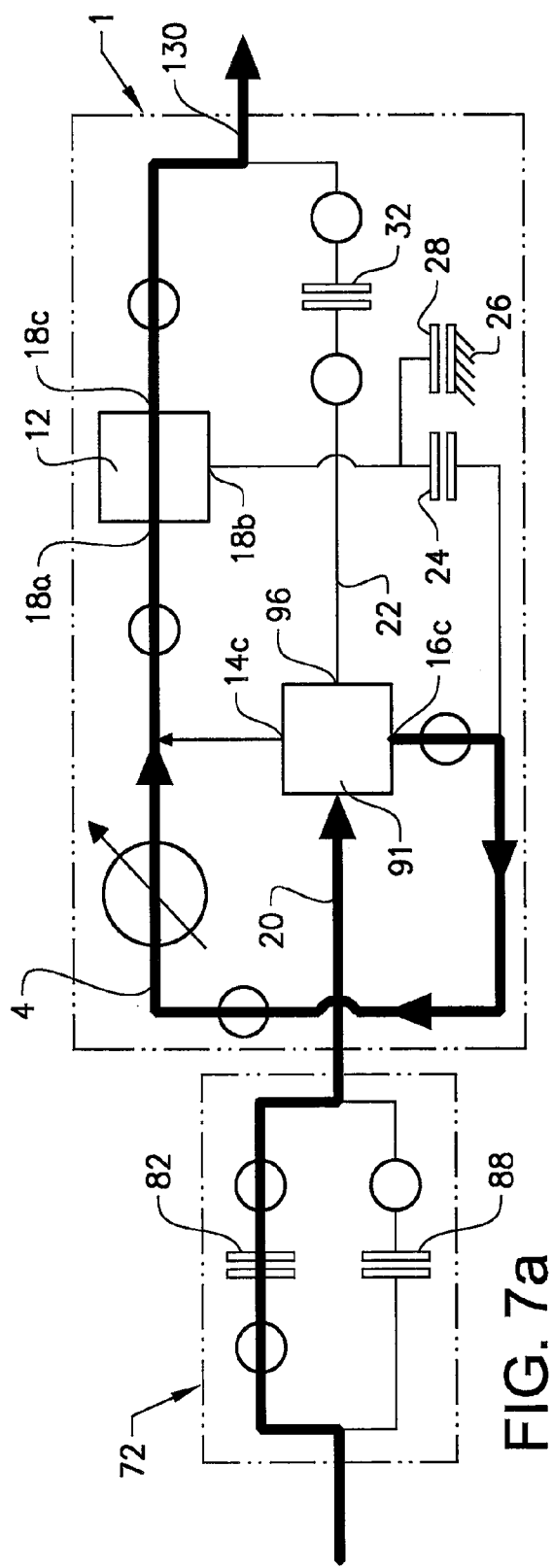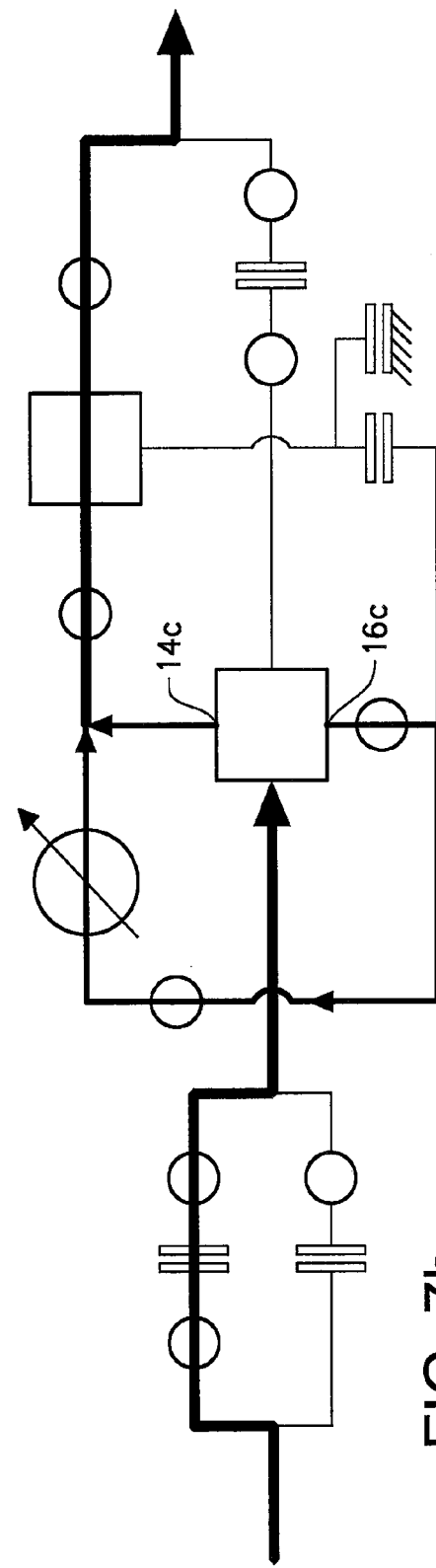
FIG. 7a
FIG. 7b

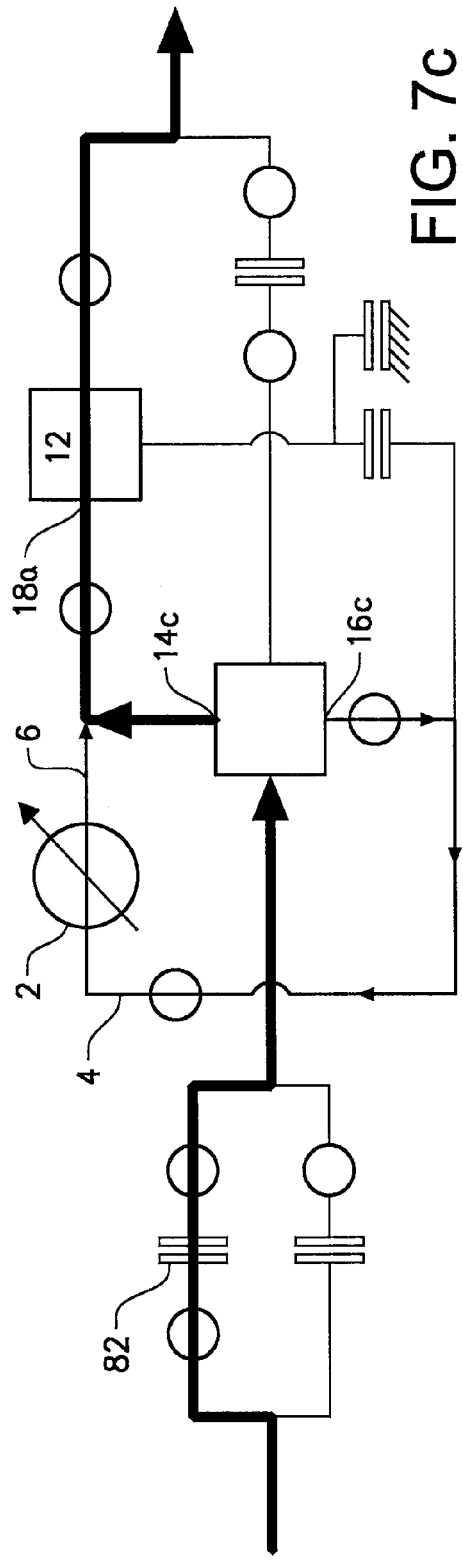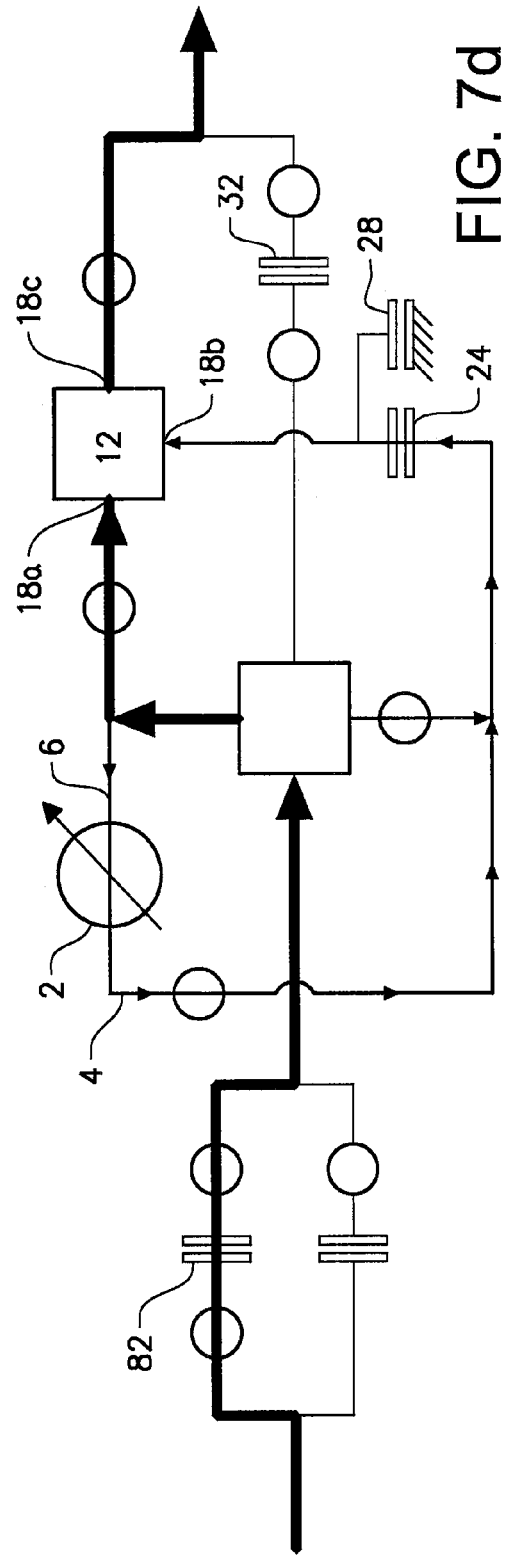

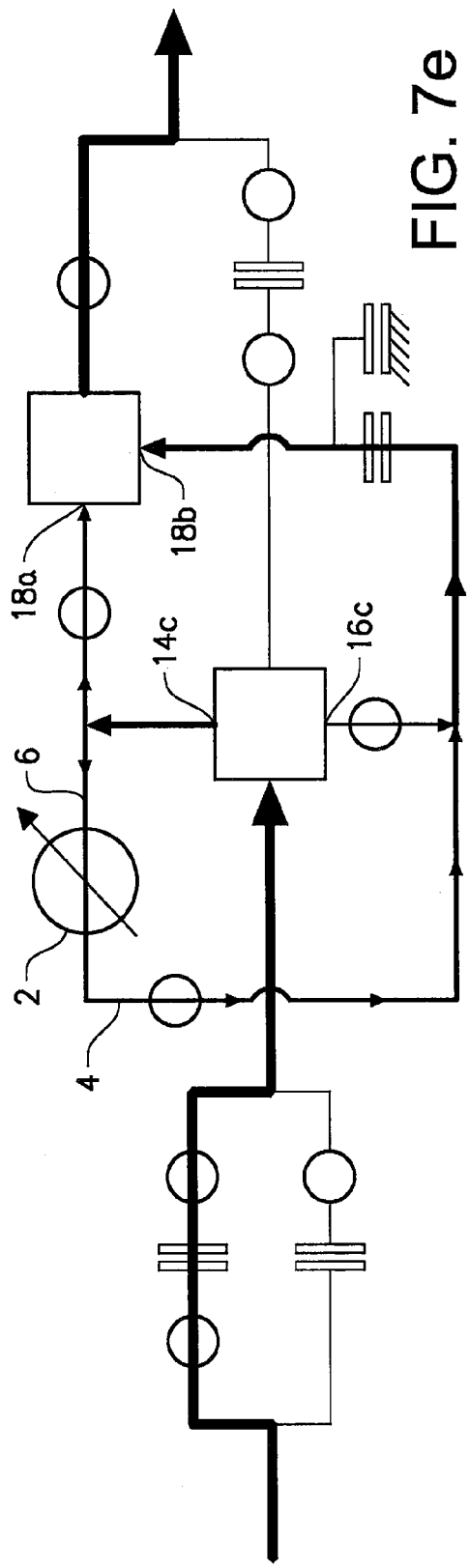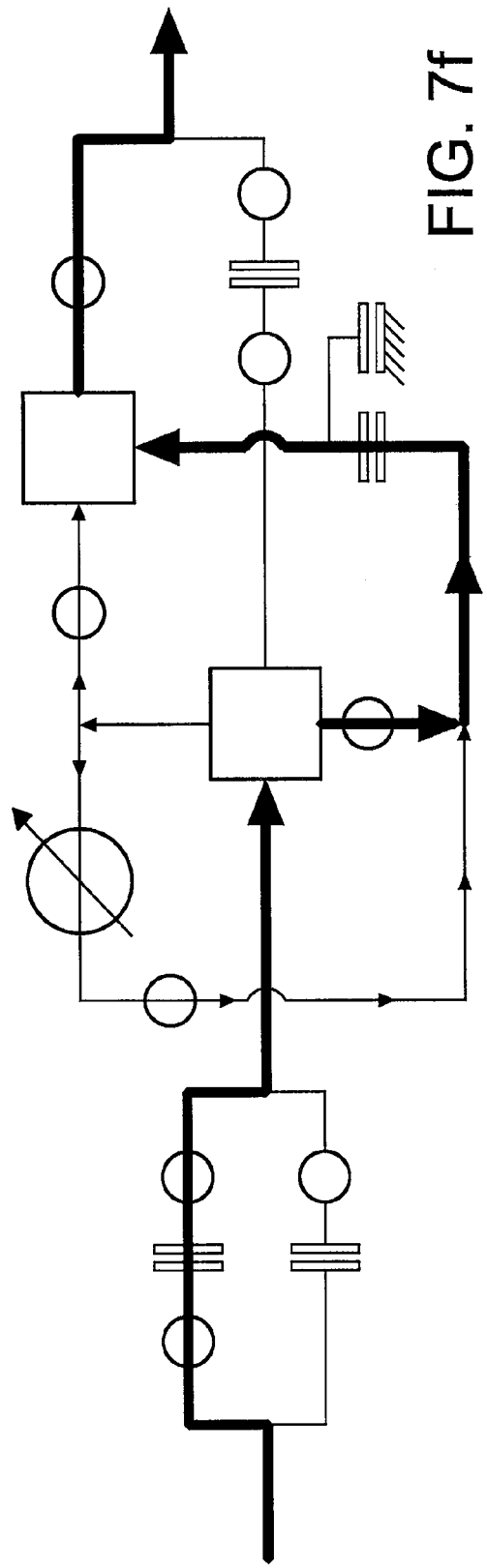

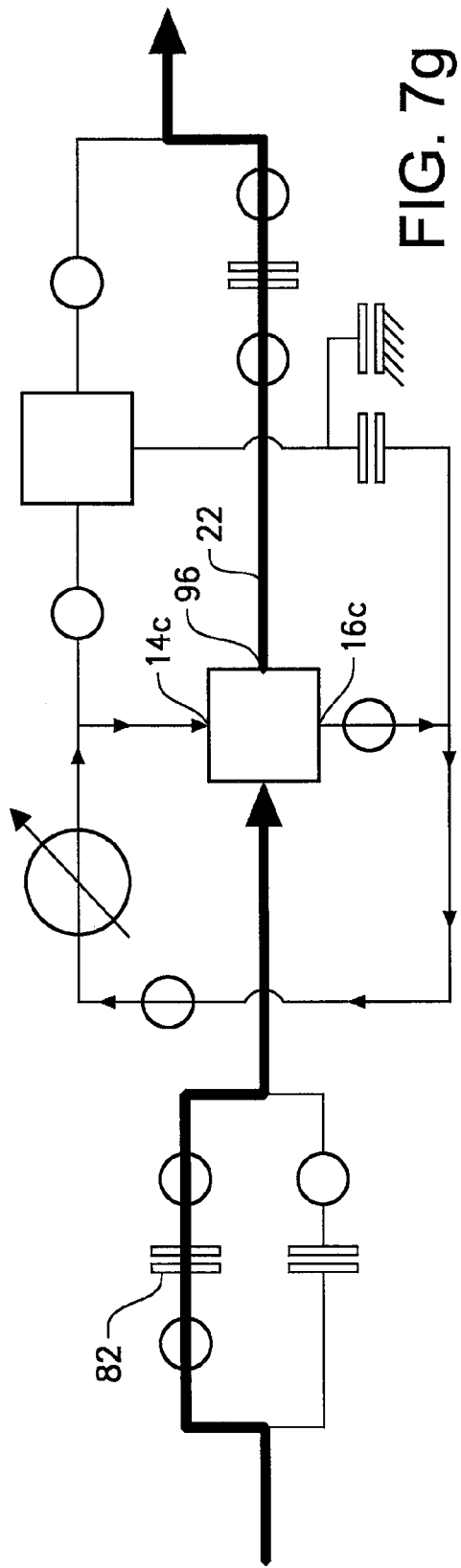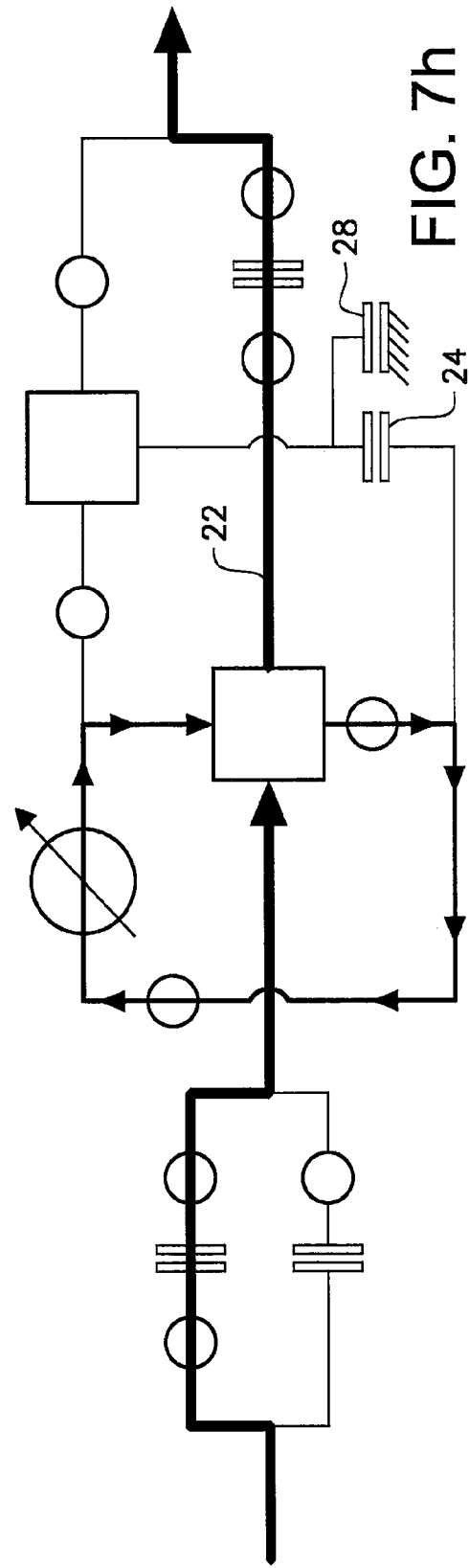

CONTINUOUSLY VARIABLE TRANSMISSION AND A WORKING MACHINE INCLUDING A CONTINUOUSLY VARIABLE TRANSMISSION

BACKGROUND AND SUMMARY

The invention relates to a continuously variable transmission and a working machine comprising such a continuously variable transmission.

The invention is applicable on working machines within the fields of industrial construction machines, in particular wheel loaders and articulated haulers. Although the invention will be described hereinafter with respect to a wheel loader, the invention is not restricted to this particular machine, but may also be used in other heavy working machines, such as dump trucks, graders, excavators or other construction equipment.

A continuously variable transmission is a transmission which speed ratio can be continuously varied over a designed range. Continuously variable transmissions are useful due to enabling operation of a prime mover at optimum speed or at optimum fuel economy while still providing a desired rotational speed at the output shaft of the transmission. In a continuously variable transmission a speed ratio between the output shaft speed to the input shaft speed of zero may be obtainable. Such a continuously variable transmission is usually referred to as an infinitely variable transmission. The existence of an output to input speed ratio of zero enables a geared neutral function where the input shaft is rotating when the output shaft stands still. The presence of a geared neutral position is useful in many industrial contexts, such as within gearboxes of working machines for example, since it may obviate the need of a starting clutch or a torque converter. Furthermore, infinitely variable transmissions facilitate separation of operation of a hydraulic system included for performing lifting operations and/or steering the working machine from the propulsion of the working machine, since the hydraulic system can be powered from a power take off at an input shaft, which may be kept running, while an output shaft connected to propulsion drive train can be kept at stand still. A typical arrangement of a continuously variable transmission includes a continuously variable unit, variator unit, having a variator input shaft and a variator output shaft connected to a planetary gear system.

An example of a continuously variable transmission is disclosed in U.S. Pat. No. 5,980,410.

U.S. Pat. No. 5,980,410, and in particular the embodiment disclosed in FIG. 2 constitutes the closest prior art and relates to a continuously variable transmission according to the preamble of claim 1.

The continuously variable transmission as disclosed in FIG. 2 of U.S. Pat. No. 5,980,410 includes a variator unit having a variator input shaft and a variator output shaft, and first, second and third planetary gear sets. The first and second planetary gear sets are arranged together and including each a first member being operatively connected to a common transmission input shaft and a second member being operatively connected to a common output shaft. Each of said first and second planetary gear sets further including a third member. A third planetary gear set having a first, second and third member is also included. The variator input shaft is operatively connected to the common output shaft and the variator output shaft is operatively connected to the third member of the first planetary gear set and selectively connectable to a transmission output shaft. The first member of said third planetary gear set is operatively connected to the third member of the first planetary gear set, and the second member of the third planetary gear set is operatively connected to the common output shaft. The third member of the third planetary gear set is selectively connectable to the transmission output shaft. Finally the third member of the second planetary gear set is selectively connectable to the transmission output shaft.

The continuously variable transmission disclosed in U.S. Pat. No. 5,980,410 enables selection between a set of operating modes having different bands of input to output speed ratios.

A problem with U.S. Pat. No. 5,980,410 is that the configuration of the continuously variable transmission will require presence of gear stages with a substantial gear ratio in order to enable the bands of input to output speed ratios to not substantially overlap. In order to provide for appropriate gear ratio of the steps additional sets of gear wheels may be needed, which makes the transmission more bulky, complex and expensive.

It is desirable to provide a continuously variable transmission which enables operation in at least three operating modes having different bands of input to output speed ratios and which transmission having a design facilitating separation of the bands of input to output speed ratios by limiting the need of additional sets of gear wheels in the transmission design.

The continuously variable transmission according to an aspect of the invention includes a variator unit having a variator input shaft and a variator output shaft, and first, second and third planetary gear sets. Each of the first and second planetary gear sets has a first member being operatively connected to a transmission input shaft which transmission input shaft is common to the first and second gear sets. Further, each of the first and second planetary gear sets has a second member being operatively connected to an output shaft which output shaft is common to the first and second gear sets. Each of said first and second planetary gear sets further including a third member.

The third planetary gear set includes a first, a second and a third member. The variator input shaft is operatively connected to the third member of said second planetary gear set and the variator output shaft is operatively connected to the third member of said first planetary gear set. The variator is thus connected in parallel to the first and second planetary gears sets.

The inclusion of the first and second planetary gear sets enables the power transmitted to be split between the variator unit and the planetary gear sets. By such a gearbox having a powersplit, in many operation modes only a minor part of the power has to be transmitted by the variator unit. The remaining power is transmitted by the planetary gear wheel unit. This implies an improved overall efficiency since the loss of energy is considerably smaller with respect to the planetary gear wheel unit compared to the variator unit. Furthermore, the size of the variator unit can be reduced.

The third planetary gear set having a first, second and third member.

The first member of said third planetary gear set is operatively connected to said variator output shaft.

The third member of said third planetary gear set is operatively connected to a transmission output shaft.

The second member of the third planetary gear set is selectively connectable to said the third member of the second planetary gear set and selectively connectable to the transmission housing. This enables a first and a second operating mode by selecting to connect the second member of the third planetary gear set to either the third member of the second planetary gear set or to the transmission housing. In the event the second member of the third planetary gear set is connected to the transmission housing, the continuously variable transmission will be worked in a first operating mode where the third planetary gear set will work as a reduction gear set enabling a large transmission ratio over the third planetary gear set. In the event the second member of the third planetary gear set is connected to the third member of the second planetary gear set, the continuously variable transmission will be worked in a second operating mode where the first, second and third planetary gear sets will work as a bridge, where the input shaft and output shaft of the variator are neither connected to the transmission input shaft nor the transmission output shaft. By the continuously variable transmission design according to an aspect of the invention, the third planetary gear set will work according to three different principles when the continuously variable transmission assumes the first, second and third operating modes. In the first mode the third planetary gear set works as a reduction gear, in the second mode the third planetary gear set merges power supplied to the first and second members of the third planetary gear set and in the third mode the thud planetary gear set is a passive unit.

Here and below the output shaft common to the first and second gear sets is referred to as the common output shaft. The common output shaft is selectively connectable to the transmission output shaft. In the event the common output shaft is connected to the transmission output shaft the continuously variable transmission will be worked in a third operating mode where power will be transmitted to the transmission output shaft from the second members of the first and second planetary gear sets. Likewise as in the second operating mode, the first and second planetary gear sets of the continuously variable transmission will in the third operating mode work as a bridge having an input shaft, an output shaft and a variator connected to two additional shafts.

The use of the third planetary gear set as a reduction gear set will enable a large gear ratio over the third planetary gear set. This facilitates separation of the bands of input to output speed ratios of the different operating modes.

The selective connection to the transmission housing may be performed by a locking mechanism arranged to lock the second member of said third planetary gear set to the transmission housing, and to release the second member of the third planetary gear set from the transmission housing, respectively.

A clutch may be arranged in between the second member of the third planetary gear set and the third member of the second planetary gear set in order to accomplish an operative connection between the third planetary gear set and the third member of the second planetary gear set or a release of the operative connection.

A clutch may be arranged in between said common output shaft and said transmission output shaft in order to allow for engagement or disengagement of the common output shaft to the transmission output shaft.

Optionally the first, second and third members of said third planetary gear set are in the mentioned order constituted by a sun gear, a ring gear and a planet carrier.

Optionally, the first, second and third members of the first planetary gear set are in the mentioned order constituted by a ring gear, a planet carrier and a sun gear, and that the first, second and third members of the second planetary gear set are in the mentioned order constituted by a planet carrier, a ring gear and a sun gear.

Here and below, a planet carrier common to the first and second planet gears is referred to as a common planet carrier and a ring gear common to the first and second planetary gears are referred to as a common ring gear. Optionally the first members of said first and second planetary gear sets are constituted by a common planet carrier and that said second members of said first and second planetary gear sets are constituted by a common ring gear and that third members of said first and second planetary gear sets are constituted by a first and a second sun gear.

Optionally, the first members of said first and second planetary gear sets are constituted by a common ring gear and that said second members of said first and second planetary gear sets are constituted by a common planet carrier and that said third members of said first and second planetary gear sets are constituted by a first and a second sun gear.

Here and below a transmission input shaft common to the first and second planetary gear sets, that is engaging, with or otherwise being connected to the first members of both the first and second planetary gear sets, are referred to as a common transmission input shaft. A mode selection arrangement may be provided which enables different operating modes with different bands of continuously variable speed ratios between said common transmission input shaft and said transmission output shaft.

A total speed ratio $i_{total}$ may be defined as the rotational speed of the transmission output shaft $\omega_{transmission, output}$ to the rotational speed of the transmission input shaft, that is:

$$\omega_{transmission, input}, i_{total} = \omega_{transmission, output} / \omega_{transmission, input}$$

A variator speed ratio may be defined as the rotational speed of the variator output shaft $\omega_{variator, output}$ to the rotational speed of the variator input shaft $\omega_{variator, input}$, that is;

$$i_{variator} = \omega_{variator, output} / \omega_{variator, input}$$

Preferably a first hand of the first operating, mode extends from a total speed ratio itotai over the continuously variable transmission, which is equal to zero for a variator speed ratio of zero, to a ratio $i_{total}=k$ for a variator speed ratio of infinity. A second band of a second operating mode preferably extends from ratio $i_{total}=k$ for a variator speed ratio of infinity, to a ratio $i_{total}=m$ for a variator speed ratio of zero. A third band of a third operating mode preferably extends from ratio $i_{total}=m$ for a variator speed ratio of zero to a ratio $i_{total}=n$ for a variator speed ratio of infinity. In order to enable the third band to meet the second band at a variator speed ratio of zero, a gear stage may be arranged in between the common output shaft and the transmission output shaft.

The mode selection arrangement may include a locking mechanism, a first clutch, a second clutch and a set of actuators. The locking mechanism is arranged to selectively lock and release said second member of said third planetary gear set to the transmission housing. The first clutch is arranged in between said second member of said third planetary gear set and said third member of said second planetary gear set. The second clutch is arranged in between said common output shaft and said transmission output shaft.

Further a set of actuators are arranged to control engagement and disengagement of said first and second clutch and arranged to control release and locking of said locking mechanism.

The mode selection arrangement may include a controller arranged for operating the set of actuators controlling the operation of the locking, mechanism, first clutch and second clutch.

Mode changes are preferably performed when the rotational speeds at input and output of the clutch next in turn to be engaged are synchronous.

The controller enables selective operation of the continuously variable transmission in a first operating mode where the locking mechanism is locked and said first and second clutches are disengaged, in a second operating mode where the locking mechanism is released, said first clutch is engaged and the second clutch is disengaged, and in a third operating mode where the locking mechanism is released, the first clutch is disengaged and the second clutch is engaged.

Optionally the variator unit is of hydraulic type. In this case the variator unit includes a first hydraulic machine provided with the input shaft of the variator unit and a second hydraulic machine provided with the output shaft of the variator unit, the first and second hydraulic machines being hydraulically connected to each other.

The configuration of the continuously variable transmission allows the variator unit to be controlled by a dual yoke enabling simultaneous control of displacements of the first and second hydraulic machines via a single actuator. The continuously variable transmission is enabling at least three different operating modes having a ratio ivanator=wVanator, output/wVanator, input with the same sign for each operating mode thereby enabling, common control for the first and second hydraulic machines via a single actuator.

Optionally the variator unit is of an electric type. In this case the variator unit includes a first electric machine provided with said input shaft of the variator unit and a second electric machine provided with the output shaft of the variator unit, the first and second electric machines being electrically connected to each other.

The invention, according to an aspect thereof, may be particularly useful in connection with a working machine, such as a wheel loader.

A working machine may be provided with a bucket, container or other type of implement for digging, lifting, carrying and/or transporting a load. A working machine may be operated with large and heavy loads in areas where there are no roads, for example for transports in connection with road or tunnel building, sand pits, mines and similar environments.

A working machine, such as a wheel loader is usually provided with a prime mover, such as an internal combustion engine, a transmission line with a torque converter and a gearbox for supplying power to the driving wheels of the wheel loader. In addition to supply power to the driving wheels, the internal combustion engine has to supply power to one or more hydraulic pumps of a hydraulic system of the wheel loader. Such a hydraulic system is used for lifting operations and/or steering the working machine.

Hydraulic working, cylinders may be arranged for lifting and lowering a lifting arm unit, on which a bucket, forks or other type of attachment or working tool is mounted. By use of another hydraulic working cylinder, the bucket can also be tilted or pivoted. Further hydraulic cylinders known as steering cylinders are arranged to turn the wheel loader by means of relative movement of a front body pan and a rear body part of the wheel loader which body parts are pivotally connected relative to each other.

The gearbox is a continuously variable transmission as described above which gives a lot of advantages compared to a stepped gearbox. For example, the velocity of the working machine can be controlled independently of the speed of rotation of the prime mover. If the continuously variable transmission has a speed of rotation range comprising a mode where the rotation speed of the output shaft of the gearbox is zero or close to zero independently of the rotation speed of the input shaft of the gearbox at the same time as torque can be transmitted from the input shaft to the output shaft (usually referred to as an infinitely variable transmission (IVT) with geared neutral), the torque converter traditionally used in working machines can be omitted. By the expression "zero or close to zero" is meant a speed of rotation of the output shaft which is zero or in the size of a few rotations per minute.

By the continuously variable transmission and the geared neutral function the operation of the hydraulic system can be separated from the propulsion of the working machine for all vehicle speeds. Furthermore, the hydraulic system can be driven by the prime mover when the working machine stands still without using any clutch for disengagement of the prime mover relative to the transmission line.

BRIEF DESCRIPTION OF DRAWINGS

With reference to the appended drawings, below follows a more detailed description of embodiments of the invention cited as examples.

In the drawings:

FIGS. 7a-7i show the power flow in the different operating modes obtainable by the second embodiment shown in FIG. 6.

DETAILED DESCRIPTION

Figure 1:
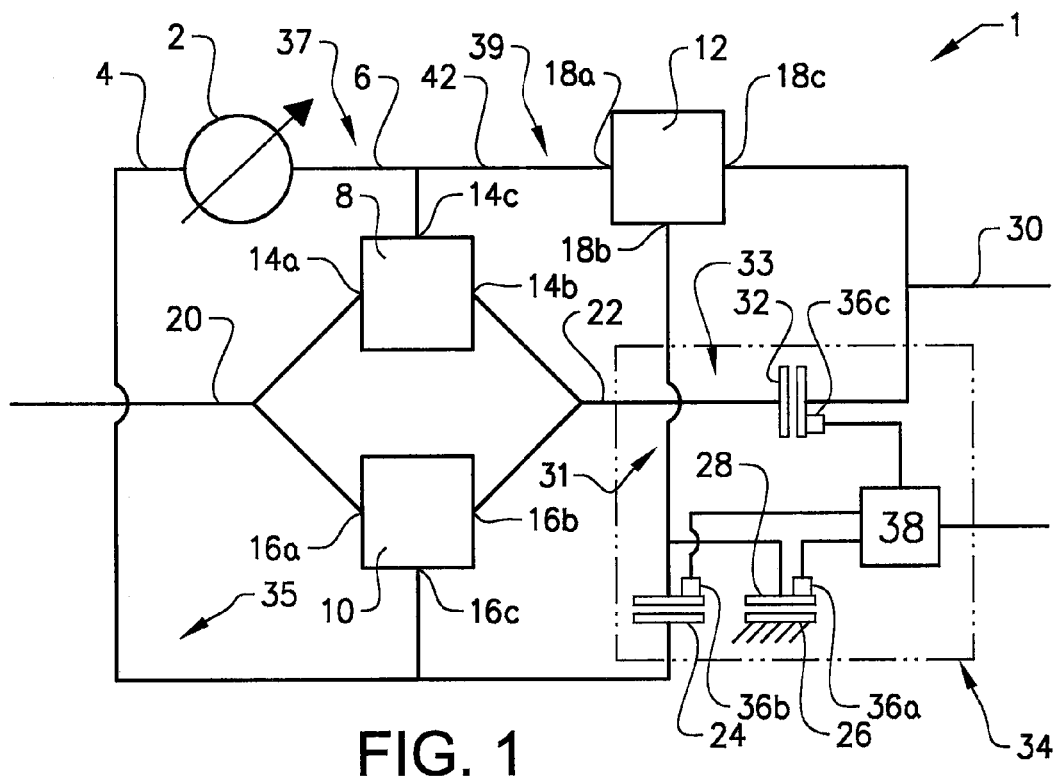
FIG. 1 shows a schematic illustration of the design of a continuously variable transmission according to the invention.

In FIG. 1 a schematic illustration of the design of a continuously variable transmission 1 according to the invention is shown. The continuously variable transmission 1 includes a variator unit 2 having a variator input shaft 4 and a variator output shaft 6. The variator unit may be of a hydraulic type including a first hydraulic machine provided with the input shat of the variator unit and a second hydraulic machine provided with the output shaft of the variator unit, the first and second hydraulic machines being hydraulically connected to each other, or of an electric type including a first electric machine provided with said input shaft of the variator unit and a second electric machine provided with the output shaft of the variator unit, the first and second electric machines being electrically connected to each other. Preferably the variator is of the hydraulic type. In one embodiment the variator unit may be a hydrostatic transmission having two bent axis- or swash plate type axial piston units which are alternatively operated as a pump and as a motor, with the two axial piston units being adjustable together with a pivotable dual yoke or by a pivotable dual swashplate. Such variator units are well known to persons skilled in the art and are described in detail in DE1064311 or U.S.2009/0020004 for example.

The continuously variable transmission further includes first, second and third planetary gear sets 8, 10 12 respectively. The planetary gear sets are of conventional type including a first, second and third member 14a, 14b, 14c; 16a, 16b, 16c; 18a, 18b, 18c. Typically the first, second and third members are constituted by a sun gear, a planet carrier and a ring gear.

The first and second planetary gear sets 8, 10 are arranged together. This means that the planetary gear sets have a common transmission input shaft 20 operatively connected to a respective first member of each of the first and second planetary gear sets 14a, 16a and a common output shaft 22 operatively connected to a respective second member of each of the first and second planetary gear sets 14b, 16b.

The operative connection between the input shaft and the first members and the operative connection between the output shaft and the second members may be constituted by a direct connection where the input shaft is directly connected, possibly as an integral part, without any intermediate gear stages to the first member, and the second member is directly connected, possibly as an integral part, without any intermediate gear stages, to the output shaft.

In the continuously variable transmission according to the embodiment of the invention illustrated in FIG. 1, the variator input shaft 4 is operatively connected to the third member 16c of the second planetary gear set 10. By operatively connected it is here intended that the connection may be made via a set of gear stages. The gear stages for connection between the variator input shaft 4 and the third member 16c of the second planetary gear set 10 may be included for allowing a connection between the third member of the second planetary gear set 10 and variator input shaft 4 to be made without making a gearbox topology substantially more complex. The connection may alternatively be direct.

The variator output shaft 6 is operatively connected to the third member 14c of the first planetary gear set 8. By operatively connected it is here intended that the connection may be made via a set of gear stages. The gear stages for connection between the variator output shaft 6 and the third member 4c of the first planetary gear set 8 may be included for allowing a connection between the third member of the first planetary gear set 8 and variator output shaft 6 to be made without making a gearbox topology substantially more complex. The connection may alternatively be direct.

The first member 18a of said third planetary gear set 2 is operatively connected to the variator output shaft 6. By operatively connected it is here intended that the connection may be made via a set of gear stages. The gear stages for connection between the variator output shaft 6 and the first member 18a of the third planetary gear set 12 may be included for allowing a connection between the variator output shaft 6 and third member of the first planetary gear set 8 and the first member 18a of the third planetary gear set 2 to be made without making a gearbox topology substantially more complex. The connection may alternatively be direct.

The second member 18b of the third planetary gear set 12 is selectively connectable to the third member 16c of the second planetary gear set 10. By selectively connectable is here intended that the connection between the second member 18b of the third planetary gear set 12 and the third member 16c of the second planetary gear set 10 may be engaged or disengaged. Therefore a clutch 24 may be arranged in between the second member of said third planetary gear set and the third member of said second planetary gear set. The clutch 24 may be of any type suitable for making the connection. Also here, a branch 31 connecting the third planetary gear set 12 and the third member 16c of the second planetary gear set 10 may in addition to the clutch 24 include gear stages for enabling, connection between the second member of said third planetary gear set and the third member of said second planetary gear set to be made without making a gearbox topology substantially more complex.

The second member 18b of the third planetary gear set 12 is selectively connectable to the transmission housing 26. By selectively connectable is here intended that the connection between the second member 18b of the third planetary gear set 12 and the transmission housing 26 may be engaged or disengaged. Therefore a locking unit 28 may be arranged in between the second member 18b of said third planetary gear set 12 and the transmission housing 26. The locking, unit 28 may be of any type suitable for locking and releasing second member 18b of the third planetary gear set 12 to the transmission housing 26. Here, a branch connecting the third planetary gear set 12 and the transmission housing is generally made without any gear stages, but may include gear stages for enabling connection between the second member of said third planetary gear set and the transmission housing.

The third member 18c of the third planetary gear set 12 is operatively connected to a transmission output shaft 30. By operatively connected it is here intended that the connection may be made via a set of gear stages. The gear stages may be included for allowing a connection between the third member 18c of the third planetary gear set 12 to the transmission output shaft 30 to be made without making a gearbox topology substantially more complex. The connection may alternatively be direct.

The common output shaft 22 is selectively connectable to the transmission output shaft 30. By selectively connectable is here intended that the connection between the common output shaft 22 and the transmission output shaft 30 may be engaged or disengaged. Therefore a clutch 32 may be arranged in between the common output shaft 22 and the transmission output shaft 30. The clutch 32 may be of any type suitable for making the connection. Also here, a branch 33 connecting the common output shaft 22 and the transmission output shaft 30 may in addition to the clutch 32 include gear stages for enabling a third band of transmission speed ratios to meet a second band of transmission speed ratios at a variator speed ratio of zero, as described in relation to FIG. 10.

The continuously variable transmission 1 includes 5 branches, a first branch 31 connecting the second member 18b of the third planetary gear set 12 to the third member 16c of the second planetary gear set 10, a second branch 35 connecting the third member 16c of the second planetary gear set 10 with the variator input shaft 4, a third branch 37 connecting the variator output shaft 6 to the third member 14c of the first planetary gear set 8, a fourth branch 39 connecting the third member 14c of the first planetary gear set 8 to the first member 18a of the third planetary gear set 12. A fifth branch 33 connecting the common output shaft 22 to the transmission output shaft 30. Each of these branches may include gear stages. Typically any gear stages in the first and fourth branches 31, 39 would be included to provide easy access from the third planetary gear set 12 to the third members 14*c*, 16*c* of the first and second planetary gear sets 8, 10. Gear stages in the second and third branches 35, 37 would typically be arranged to enable the variator with its hydraulic or electric machines to operate at a desired operating speed range. The gear stages in the first branch 31 can be positioned on either side of the first clutch 24, that is on the side of the clutch 24 which is closer to the second member 18*b* of the third planetary gear set, or on the side of the clutch that is closer to the third member 16*c* of the second planetary gear set.

It is evident that the branches above which are recited as being operatively connected and selectively connected may include further gear stages in addition to gear stages enabling a selected transmission topology such as power take offs and/or further active or passive elements, such as clutches for instance. For enabling compact transmission topology the transmission should however preferably include only necessary clutches and locking elements for enabling the intended operating modes and as few gear stages as possible.

The continuously variable transmission 1 thus includes a mode selection arrangement 34 which enables different operating modes with different bands of continuously variable speed ratios between the common input shaft 20 and the transmission output shaft 30.

The mode selection arrangement 34 includes the locking mechanism 28 arranged to selectively lock and release the second member 18*b* of said third planetary gear set 12 to the transmission housing 26, the first clutch 24 arranged in between the second member 18*b* of the third planetary gear set 12 and the third member 16*c* of the second planetary gear set 10, and the second clutch 32 arranged in between the common output shaft 22 and the transmission output shaft 30, a set of actuators 36*a*, 36*b*, 36*c* arranged to control release and locking of said locking mechanism 28 and arranged to control engagement and disengagement of the first and second clutches 24, 32.

The mode selection arrangement 34 includes a controller 38 arranged for operating said set of actuators 36*a*, 36*b*, 36*c*.

The controller 38 enables selective operation of the continuously variable transmission 1 in a first operating mode where the locking mechanism 28 is locked and said first and second clutches 24,32 are disengaged, in a second operating mode where the locking mechanism 28 is released, the first clutch 24 is engaged and the second clutch 32 is disengaged, and in a third operating mode where the locking mechanism 28 is released, the first clutch 24 is disengaged and the second clutch 32 is engaged.

The mode selection arrangement 34 is thus provided to enable different operating modes with different bands of continuously variable speed ratios between the common input shaft 20 and the transmission output shaft 30.

A speed ratio $i_{total}$ may be defined as the rotational speed of the transmission output shaft 30 $\omega_{transmission,\ output}$ to the transmission input shaft 20 $\omega_{transmission,\ input}$; that is $i_{total} = \omega_{transmission,\ output}/\omega_{transmission,\ input}$. A variator Speed ratio may be defined as $i_{variator} = \omega_{variator,\ output}/\omega_{variator,\ input}$.

Preferably, a first band of the first operating mode extends from a speed ratio $i_{total}$ over the continuously variable transmission which is equal to zero for a variator speed ratio of zero, to a ratio $i_{total}=k$ for a variator speed ratio of infinity. A second band of a second operating mode preferably extends from ratio $i_{total}=k$ for a variator speed ratio of infinity to a speed ratio in for a variator speed ratio of zero. A third band of a third operating mode preferably extends from speed ratio $i_{total}=m$ for a variator speed ratio of zero to a ratio $i_{total}=n$ for a variator speed ratio of infinity. In order to enable the third band to meet the second band at a variator speed ratio of zero, a gear stage may be arranged in between the common output shaft 22 and the transmission output shaft 30.

Figure 2:
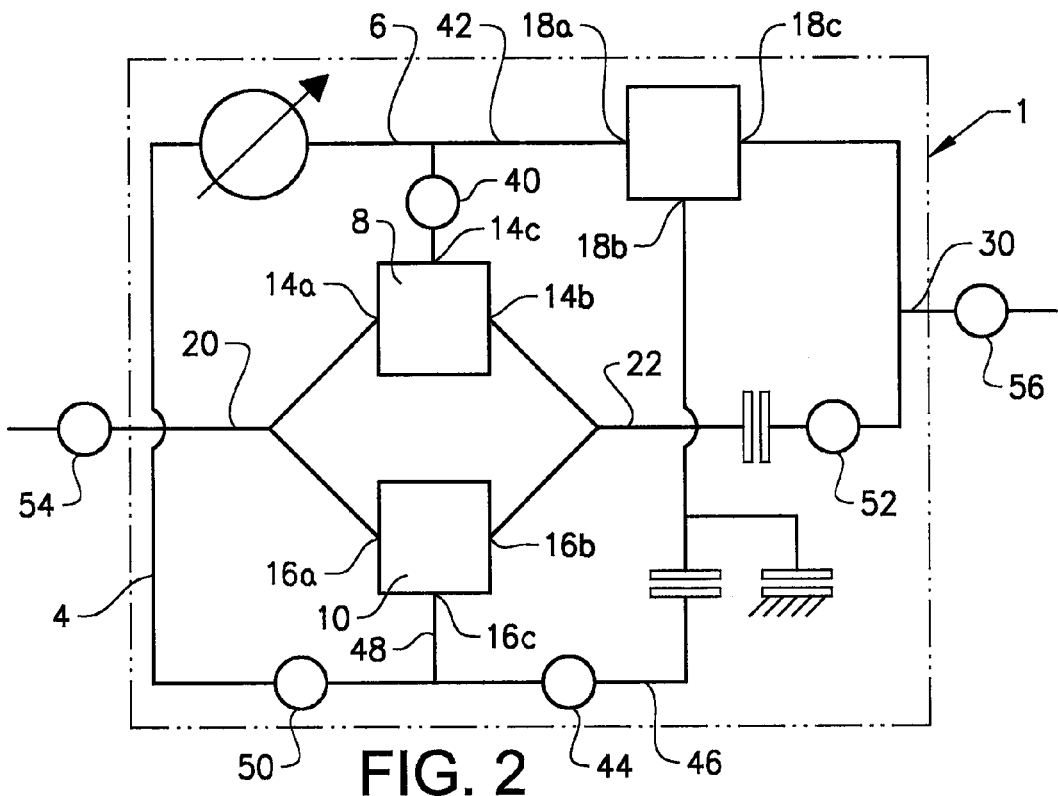
FIG. 2 shows a schematic illustration of a first specific embodiment of the continuously variable transmission according to the invention.

In FIG. 2 is shown a first specific embodiment of the invention where the first, second and third members 18*a*, 18*b*, 18*c* of the third planetary gear set 12 are in the mentioned order constituted by a sun gear, a ring gear and a planet carrier. Further, the first, second and third members 14*a*, 14*b*, 14*c* of the first planetary gear set 8 are in the mentioned order constituted by a ring gear, a planet carrier and a sun gear, and that the first, second and third members 16*a*, 16*b*, 16*c* of the second planetary gear set 10 are in the mentioned order constituted by a planet carrier, a ring gear and a sun gear.

A shaft 42 is connecting the variator output shaft 6 and the sun gear 18*a* of the third planetary gear set 12. A first gear stage 40 is arranged in between the shaft 42 and the sun gear 14*c* of the first planetary gear set 8.

A second gear stage 44 is included in the branch connecting the ring gear 18*b* of the third planetary gear set 12 and the sun gear 6*c* of the second planetary gear set 0 for enabling connection between an outgoing shaft 46 of the first clutch 24 and a shaft 48 connected to the sun gear 16*c* of the second planetary gear set 10 to be made. A third gear stage 50 is included in the branch connecting the sun gear 16*c* of the second planetary gear set 10 and the variator input shaft 4 for enabling contact between the shaft 48 connected to the sun gear 16*c* of the second planetary gear set 10 and the variator input shaft 4. A fourth gear stage 52 is included in between the common output shaft 22 and the transmission output shaft 30 in order to enable the third band of transmission speed ratios to meet the second band at a variator speed ratio of zero. Additionally a fifth and a sixth gear stage 54, 56 may be provided at the transmission input shaft and at the transmission output shaft for providing a total desired speed ratio.

Figure 3:
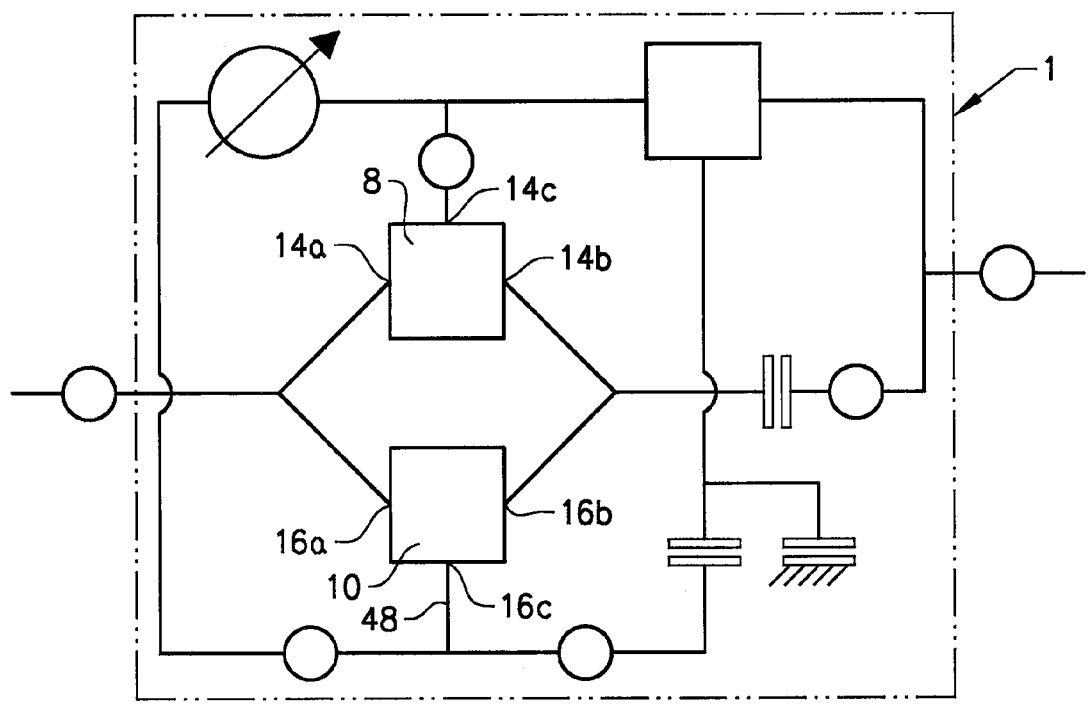
FIG. 3 shows a schematic illustration of a second specific embodiment of the continuously variable transmission according to the invention.

In FIG. 3 is shown a second specific embodiment of the invention where first members 4*a*, 6*a* of said first and second planetary gear sets 8, 10 are constituted by a common planet carrier, the second members 14*b*, 16*b* of said first and second planetary gear sets 8,10 are constituted by a common ring gear and the third members 14*c*, 16*c* of the first and second planetary gear sets 8, 10 are constituted by a first and a second sun gear. The remaining parts of the continuously variable transmission 1 are designed in the same manner as the first specific embodiment shown in FIG. 2. The first and second planetary gear sets 8, 10 may preferably be designed as a Ravigneaux planetary gear train.

Figure 4:
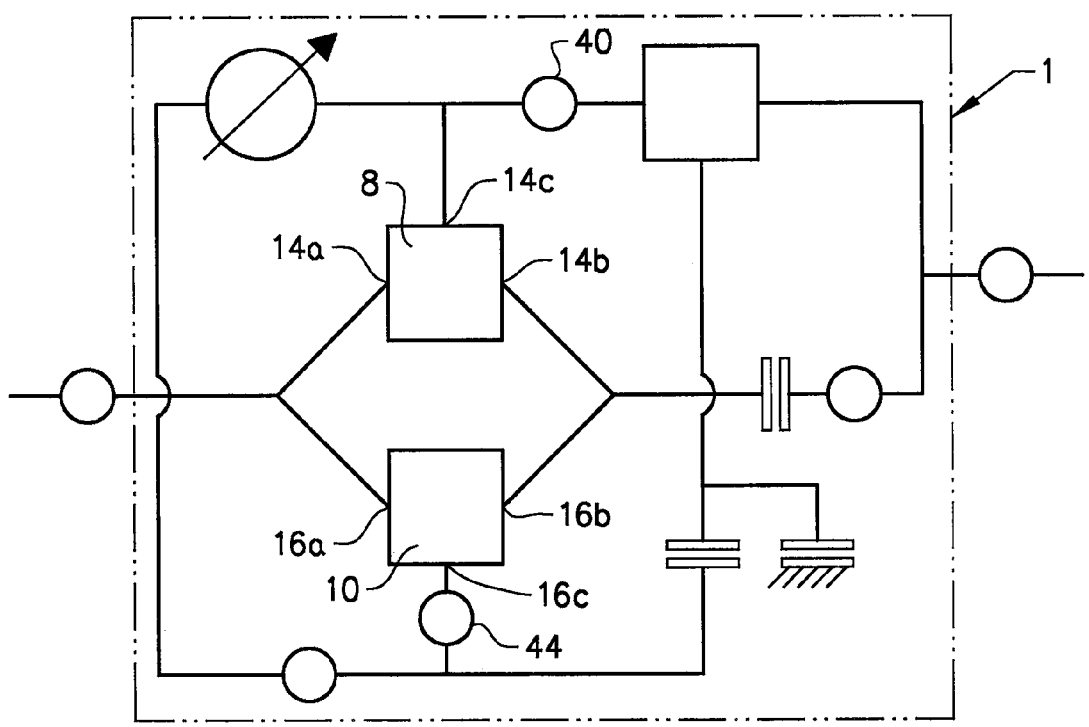
FIG. 4 shows a schematic illustration of a third specific embodiment of the continuously variable transmission according to the invention.

In FIG. 4 is shown a third specific embodiment of the invention where first members 14*a*, 16*a* of said first and second planetary gear sets 8, 10 are constituted by a common ring gear, the second members 14*b*, 16*b* of said first and second planetary gear sets 8, 10 are constituted by a common planet carrier and the third members 14*c*, 16*c* of the first and second planetary gear sets 8, 10 are constituted by a first and a second sun gear. In this embodiment the first gear stage 40 is positioned in between a shaft 42 connecting the variator output shaft 6 and the sun gear 18*a* of the third planetary gear set 12. Further, the second gear stage 44 is connected to the sun gear 16*c* of the second planetary gear set 0. The remaining parts of the continuously variable transmission 1 are designed in the same manner as the second specific embodiment shown in FIG. 3. The first and second planetary gear sets 8, 10 may preferably be designed as a Ravigneaux planetary gear train.

Figure 5:
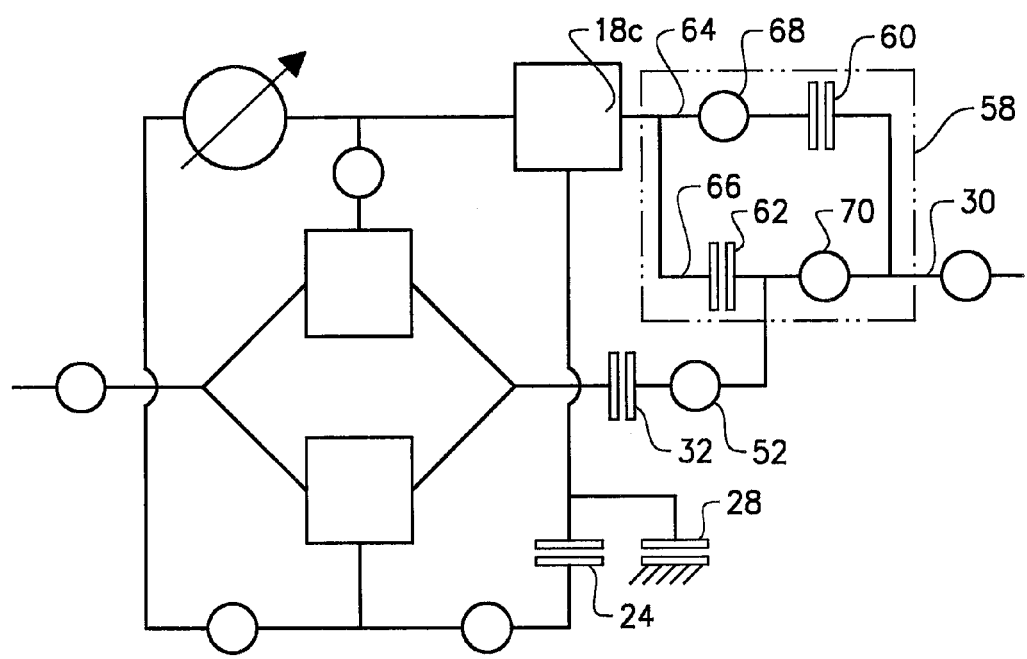
FIG. 5 shows a schematic illustration of a fourth specific embodiment of the continuously variable transmission according to the invention.

In FIG. 5 is shown a fourth specific embodiment of the invention where a mode split arrangement 58 is arranged to reuse a second operating mode where the first clutch 24 is engaged, the locking mechanism 28 is released and the second clutch 32 is disengaged.

In this embodiment the first and second gear stages 40, 44 are arranged in the same manner as in FIGS. 2 and 3.

The mode split arrangement includes a third and a fourth clutch 60, 62 arranged in a respective first and second branch 64, 66 of the mode split arrangement 58. Each branch 64, 66 are operatively connected to the third member 18c of the third planetary gear set 12 and to the transmission output shaft 30. Gear stages 68, 70 are included in the branch, which gear stages have different gear ratios in order to enable different output ratio over respective branch. The common output shaft 22 is selectively connectable to the second branch 66. A gear stage 52 is included in the branch connecting the common output shaft and the second branch 66.

The mode split arrangement can be added to any of the embodiments shown in FIGS. 1-4. In operation, either the third clutch 60 or the fourth clutch 62 is engaged when the first clutch 24 is engaged, enabling two different operating modes, the second and the fourth mode respectively, whereby the continuously variable transmission may operate in four different operating modes.

Figure 6:
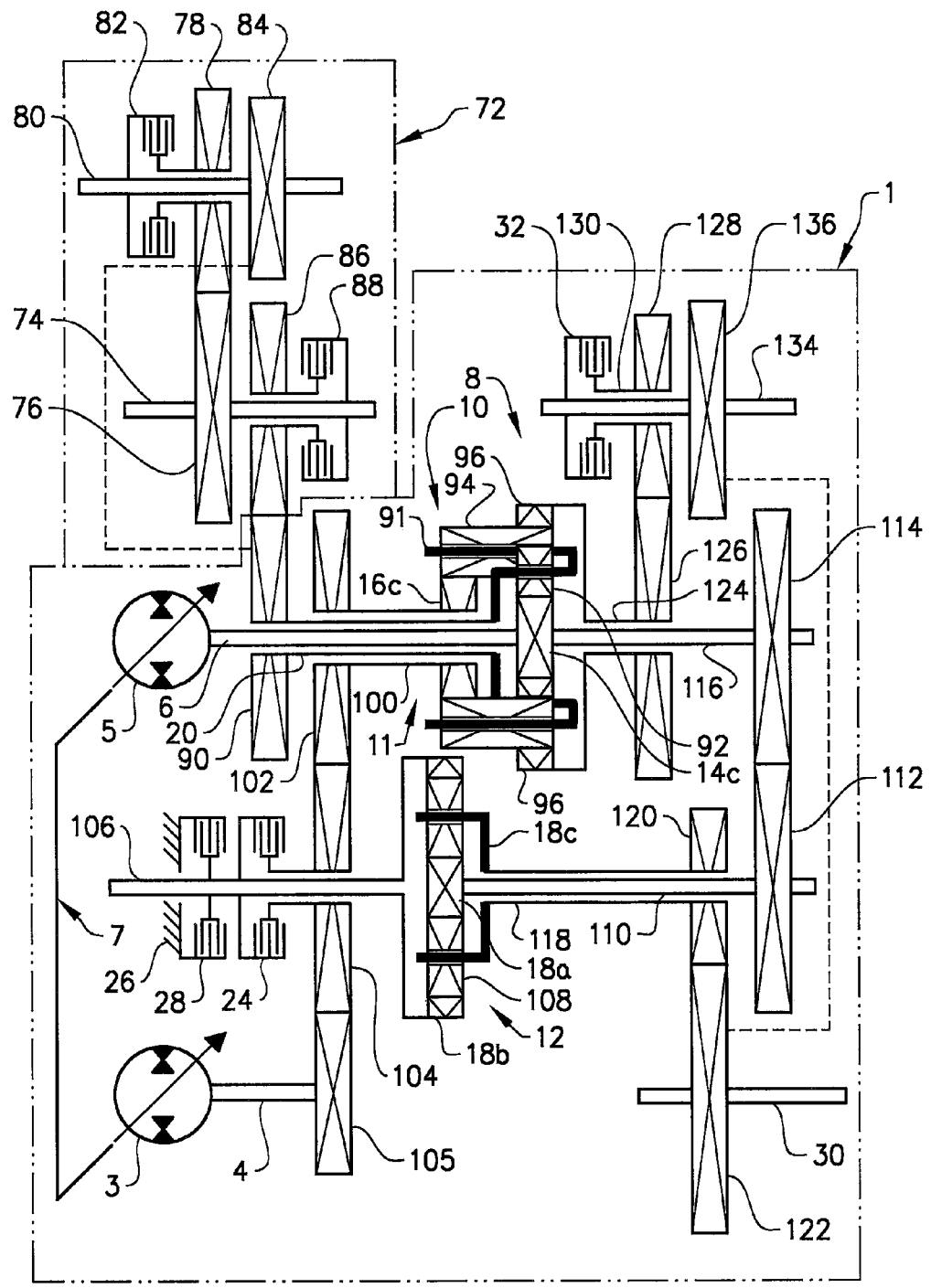
FIG. 6 shows a more detailed illustration of a variant of the second specific embodiment shown in FIG. 3.

In FIG. 6 is shown a more detailed illustration of a variant of the second specific embodiment shown in FIG. 3. To the continuously variable transmission 1 is a forward-reverse gear unit 72 added to the transmission input shaft 20. The forward-reverse gear unit 72 includes an input shaft 74 having a first gear wheel 76 being in engagement with a second gear wheel 78 releasably connected to a mid shaft 80 by a forward clutch 82. The mid shaft 80 carries a third gear wheel 84. A fourth gear wheel 86 is releasably connected to the input shaft 74 by a reverse clutch 88. When the forward clutch is engaged, the reverse clutch is disengaged and vice versa. The third and fourth gear wheels 84, 86 both engage with an input gear wheel 90 attached to the transmission input shaft 20. The transmission input shaft 20 is connected to a common planet carrier 91 of the first and second planetary gear sets 8, 10 which are arranged as a Ravigneaux planetary gear train 11.

The Ravigneaux planetary gear train including a large and a small sun gear 6c, 14c, and a common carrier 91 with sets of inner and of outer planet gears 92, 94 connected thereto. The set of inner planet gears 92 meshes with the small sun gear 14c and the set of outer planet gears 94 meshes with the large sun gear 6c and with the ring gear 96. The inner and outer planet gears 92,94 are in meshing engagement with each other.

The small sun gear 14c of the first planetary gear set 8 is connected to a variator output shaft 6 which is arranged concentrically within the transmission input shaft 20, which is hollow. The large sun gear 6c of the second planetary gear set 10 is connected via a hollow shaft 100 concentrically arranged around the transmission input shaft 20 to a gear wheel 102. The gear wheel 102 is connected to a gear wheel 104 releasably arranged on a mid shaft 106 via a first clutch 24. A locking unit 28 is arranged to selectively lock the mid shaft 106 to the transmission housing 26. The gear wheel 104 meshes with a gear wheel 105 connected to the variator input shaft 4 which is connected to a first hydraulic machine 3 included in the variator. The first hydraulic machine 3 is hydraulically connected to a second hydraulic machine 5 connected to the variator output shaft 6. The first and second hydraulic machines 3,5 may be controlled by a dual yoke 7. The mid shaft 106 is furthermore connected to the ring gear 18b of a third planetary gear set 12. The ring gear 18b meshes with planet gears 108, which in turn meshes with a sun gear 18a of the third planetary gear set 12. The sun gear 18a of the third planetary gear set 12 is connected to a shaft 110 which carries a gear wheel 112 which meshes with a gear wheel 114 arranged on a shaft 116 connected to the sun gear 14c of the first planetary gear set 8. The planet carrier 18c of the third planetary gear set 12 is attached to a hollow shaft 118 being concentric with the shaft 110 connected to the sun gear 18a. The hollow shaft 118 carries a gear wheel 120 which meshes with a gear wheel 122 on the transmission output shaft 30. The common ring gear 96 of the first and second planetary gear sets 8, 10 in the Ravigneaux planetary gear train 11 is connected to a hollow shaft 124 concentric with the shaft 116 connected to the sun gear 14c of the first planetary gear set 8. The hollow shaft 124 carries a gear wheel 126 which meshes with a gear wheel 128 on a hollow shaft 130. The hollow shaft 130 is via a clutch 32 releasably connectable to a shaft 134 arranged concentrically within the hollow shaft 130. The shaft 34 carries a gear wheel 136 which meshes with the gear wheel 122 arranged on the transmission output shaft 30.

By disengagement or engagement of the first and second clutches 24,32 respectively and by locking or releasing of the second member 8b of the third planetary gear set 12 to the transmission housing 26 by the locking unit 28, the continuously variable transmission may assume three different operating modes in a manner as explained above with reference to FIGS. 1-4.

In FIGS. 7a-7i the power flow in the different operating modes obtainable by the variant of the second embodiment shown in FIG. 6 is shown. The figures show a first and second planetary gear set arranged together as a Ravigneaux planetary gear train having a common carrier 91 connected to a transmission input shaft 20, a common ring gear 96 connected to a common output shaft 22, a first sun gear 14c, operatively connected to a variator output shaft 6 and a second sun gear 16c operatively connected to a variator input shaft 4. The common output shaft 22 is selectively connectable via a second clutch 32 to the transmission output shaft 30. A third planetary gear set 12 includes a sun gear 18a, a ring gear 18b and a planet carrier 18c. The sun gear 18a is operatively connected to the first sun gear 14c and the variator output shaft 6. The ring gear 18b is selectively connectable to a locking unit 28 and a first clutch 24 operatively connected to the second sun gear 16c. The carrier 18c is operatively connected to the transmission output shaft 30.

The transmission further includes a forward-reverse gear unit 72 having a forward clutch 82 and a reverse clutch 88 for selective engagement.

FIG. 7a shows the power flow at the beginning of the first forward mode when the variator output shaft 6 is close to standstill. The forward clutch 82 and the locking unit 28 are engaged, while the first clutch 24 and the second clutch 32 are disengaged. The power flows over the forward clutch to the transmission input shaft 20.

A majority of the power is transmitted via the second sun gear 16c to the variator input shaft 4, over the variator to the sun gear 18a of the third planetary gear set 12, which operates as a reduction gear set, since the ring gear 18b of the third planetary gear set is locked to the transmission housing 26. The power flows over the carrier 18c of the third planetary gear set to the transmission output shaft 30. The first and second planetary gear sets 8,10 operate as an output coupled shunt in the first mode wherein power to an input shaft 20 is distributed via the third member 14c of the first planetary gear set 8 to the first member 18a of the third planetary gear set 12 and via the third member 6c of the second planetary gear set 10 over the variator 2 to the first member 18a of the third planetary set 12.

FIG. 7b shows the power flow in the first operating mode when the variator input shaft rotates at the same speed as the variator output shaft. Here power is distributed in the Ravigneaux planetary gear train to the first and second sun gears 14c, 16c at equal or substantially equal magnitudes. Hence power flows to the sun gear 18a of the third planetary gear set both over the variator unit via the second sun gear 16c, and via the first sun gear 14c.

FIG. 7c shows the power flow at the end of the first operating mode where the variator input shaft 4 is close to stand still. A majority of the power flows via the first sun gear 14c to the sun gear 18a of the third planetary gear set 12, while a minor portion flows via the second sun gear 16c and the variator 2 to the sun gear 18a of the third planetary gear set 12.

FIG. 7d shows the power flow at the beginning of the second forward mode when the variator input shaft 4 is close to standstill. The forward clutch 82 and the first clutch 24 are engaged, while the locking unit 28 and the second clutch 32 are disengaged. The power flows over the forward clutch to the transmission input shaft 20. A majority of the power flows via the first sun gear 14c, while a minor portion flows via the second sun gear 16c. The flow from the first sun gear 14c is distributed to the variator output shaft 6 and the sun gear 18a of the third planetary gear set 12. Power flows over the variator unit 2 and merges with the power flow from the second sun gear 16c to the ring gear 18b of the third planetary gear set 12. The flow from the first sun gear 14c to the sun gear 18a of the third planetary gear set 12 dominates over the flow over the variator unit and the flow from the second sun gear 16c to the ring gear 18b. The first, second and third planetary gear sets 8, 10, 12 operate as a bridge in the second mode with the variator 2 connected to respective third members of the first and second planetary gear sets, the transmission input shaft 20 being connected to respective first members of the first and second planetary gear sets, and the transmission output shaft 30 being powered solely from the third member 18c of the third planetary gear set 12.

FIG. 7e shows the power flow in the second operating mode when the variator input shaft rotates at the same speed as the variator output shaft. Here power is distributed in the Ravigneaux planetary gear train to the first and second sun gears 14c, 6c such that an output power from the first sun gear 14c and the input power to the ring gear 18b of the third planetary gear set are of equal or substantially equal magnitudes. The output power from the first sun gear 14c is split to the variator output shaft 6 and the sun gear 18a. The output power from the second sun gear 16c is added to the power transmitted via the variator 2 and further transmitted to the ring gear 18b.

FIG. 7f shows the power flow at the end of the second operating mode when the variator output shaft 6 is close to standstill. Here the power follow the same routes as in FIG. 7e, while the flow over the second sun gear 16c dominates over the flow over the first sun gear 14c, such that the flow to the ring gear 18b clearly dominates over the flow to the sun gear 18a.

FIG. 7g shows the power flow at the beginning of the third forward mode when the variator output shaft 6 is close to standstill. The forward clutch 82 and the second clutch 32 are engaged, while the locking unit 28 and the first clutch 24 are disengaged. The power flows over the forward clutch to the transmission input shaft 20. A majority of the power flows to the transmission output shaft 30 via the ring gear 96 of the Ravigneaux planetary gear train and the common output shaft 22. A minor portion flows from the second sun gear 16c via the variator unit 2 to the first sun gear 14c. The first and second planetary gear sets operate as a bridge in the third operating mode.

FIG. 7h shows the power flow in the third forward mode when the variator input shaft rotates at the same speed the variator output shaft. Here the flow from the second sun gear 16c to the first sun gear 14c has increased, while still a majority of the power flows to the transmission output shaft 30 via the ring gear 96 of the Ravigneaux planetary gear train and the common output shaft 22.

Figure 7I:
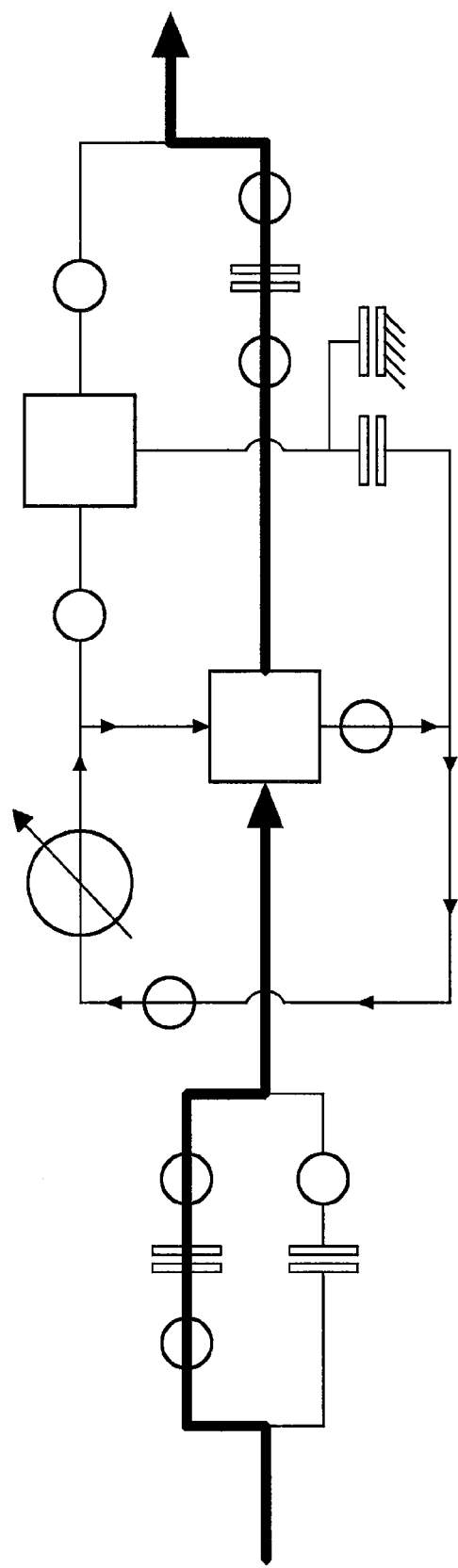

FIG. 7i shows the power flow at the end of the third forward mode when the variator input shaft 4 is close to standstill. The power flow in the same manner as in FIG. 7g, that is less power is recirculated in between the sun gears of the Ravigneaux planetary gear train as compared to the operation presented in FIG. 7h.

A first, second and third reverse mode is provided by engaging the reverse clutch 88 instead of the forward clutch.

In FIGS. 8a-8f are shown various embodiments of the continuously variable transmission according to the invention.

The continuously variable transmission 1 includes a first 8, second 10 and third 12 planetary gear sets. The first and second planetary gear sets 8, 10 are arranged together and including each a first member 14a, 16a being operatively connected to a common transmission input shaft 20 and a second member 14b, 16b being operatively connected to a common output shall 22. Each of said first and second planetary gear sets 8, 10 further includes a third member 14c, 16c. In some embodiments the first and second planetary gear sets 8, 10 are arranged as a Ravigneaux planetary gear train. In this event the first members 14a, 16a of the first and second planetary gear sets are constituted by a common planet carrier or common ring gear and the second members 14b, 16b of the first and second planetary gear sets are constituted by a common ring gear or a common planet carrier. The third planetary gear set having a first, second and third member 18a, 18b, 18c.

The continuously variable transmission further including a variator unit 2 including a first hydraulic machine 3 connected to a variator input shaft 4 and a second hydraulic machine 5 connected to variator output shaft 6.

Figure 8A:
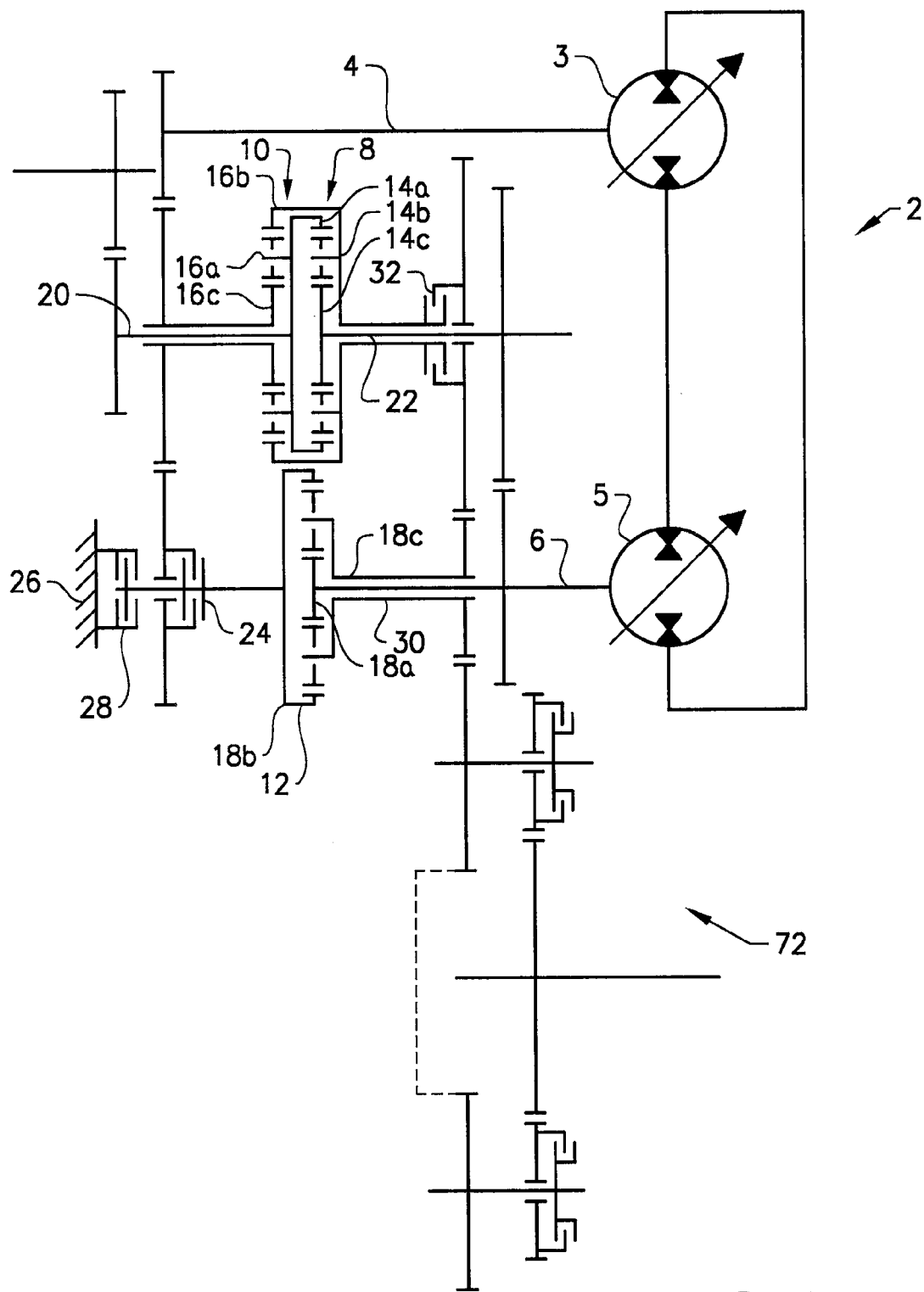
FIGS. 8a-8f show various embodiments of continuously variable transmission according to the invention.

In all embodiments the variator input shaft 4 is operatively connected to the third member 6c of the second planetary gear set 10. The variator output shaft 6 is operatively connected to the third member 14c of said first planetary gear set 8. The first member 18a of the third planetary gear set 12 is operatively connected to the variator output shaft 6. The second member 18b of the third planetary gear set 12 is selectively connectable to the third member 16c of the second planetary gear set 10 and selectively connectable to the transmission housing 26. The third member 18c of the third planetary gear set 12 is operatively connected to a transmission output shaft 30 and the common output shaft 22 is selectively connectable to the transmission output shaft 30. The continuously variable transmission 1 includes a first and second clutch unit 24, 32 and a locking unit 28 which locks to a transmission housing. Furthermore a forward-reverse gear unit 72 is provided. FIG. 8a corresponds to an embodiment as disclosed in FIG. 2, where the first, second and third members 14a, 14b, 14c of the first planetary gear set 8 are constituted by a ring gear, carrier and a sun gear in mentioned order. The first, second and third members 16a, 16b, 16c of the second planetary gear set 8 are constituted by a carrier, a ring gear and a sun gear in mentioned order. The forward reverse gear unit 72 is connected to the transmission output shaft 30.

Figure 8B:
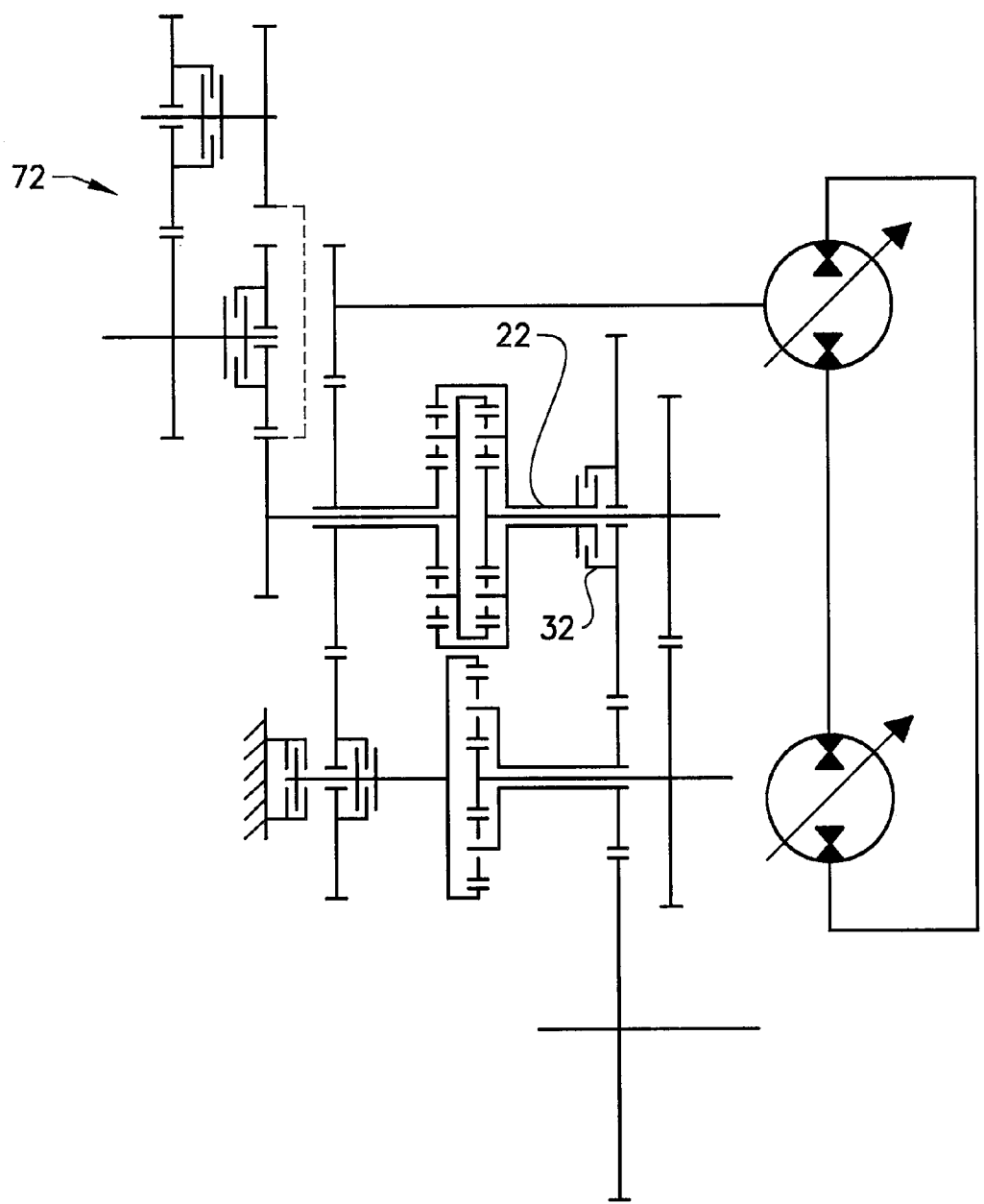

FIG. 8b corresponds to the embodiment shown in FIG. 2 with a forward reverse gear unit 72 connected to the transmission input shaft 20.

Figure 8C:
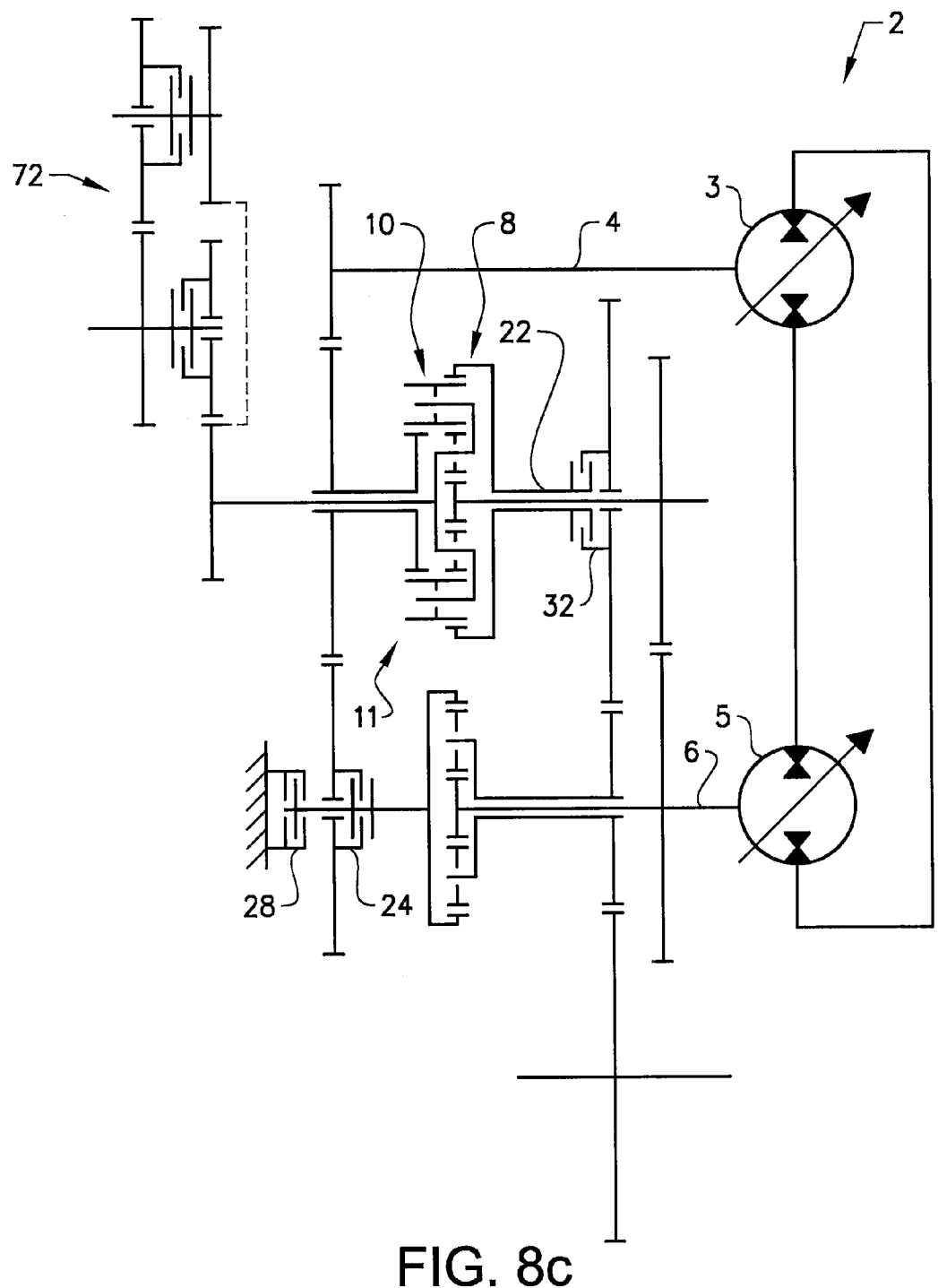

FIG. 8c corresponds to the embodiment shown in FIG. 3 where the first and second planetary gear sets 8, 10 are arranged as a Ravigneaux planetary gear train 11. The forward-reverse gear unit 72 is connected to the transmission input shaft 20.

Figure 8D:
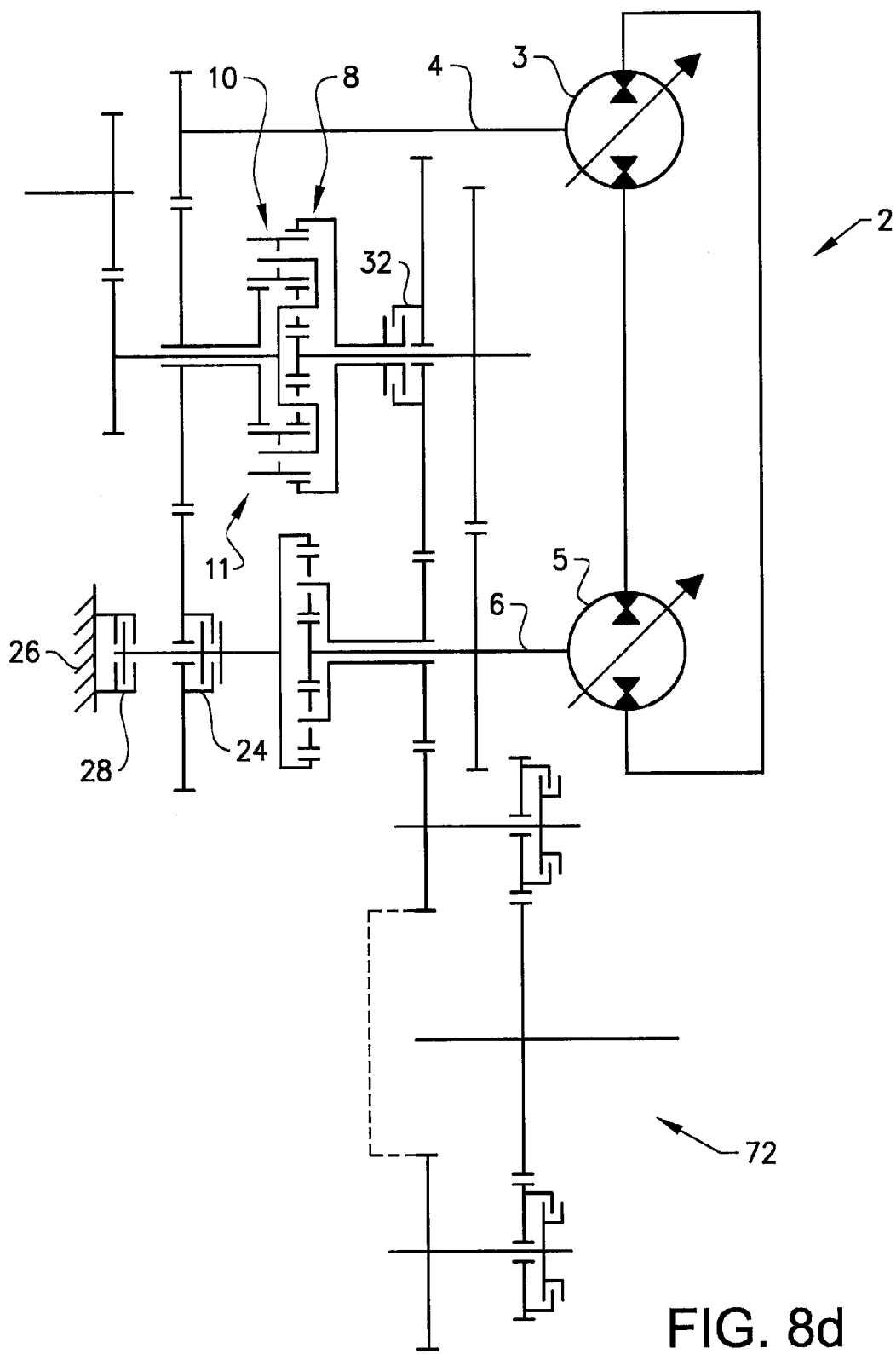

FIG. 8d corresponds to the embodiment shown in FIG. 3 where the first and second planetary gear sets 8, 10 are arranged as a Ravigneaux planetary gear train 11. The forward-reverse gear unit 72 is connected to the transmission output shaft 30.

Figure 8E:
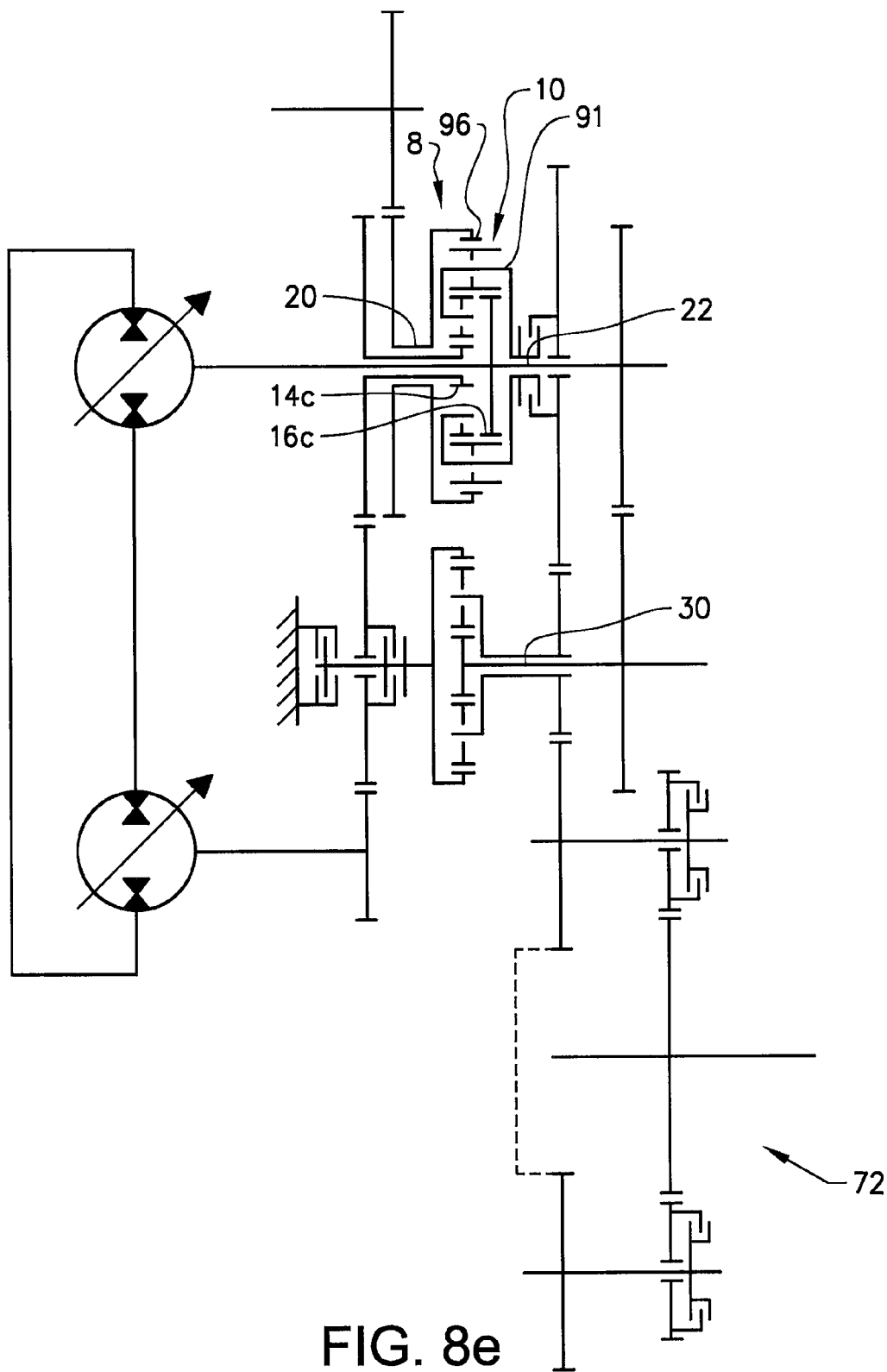

FIG. 8e corresponds to the embodiment shown in FIG. 4 where the transmission input shaft 20 is connected to a common ring gear 96 and the common output shaft 22 is connected to a common planet carrier 91. The forward reverse gear unit 72 is connected to the transmission output shaft 30.

Figure 8F:
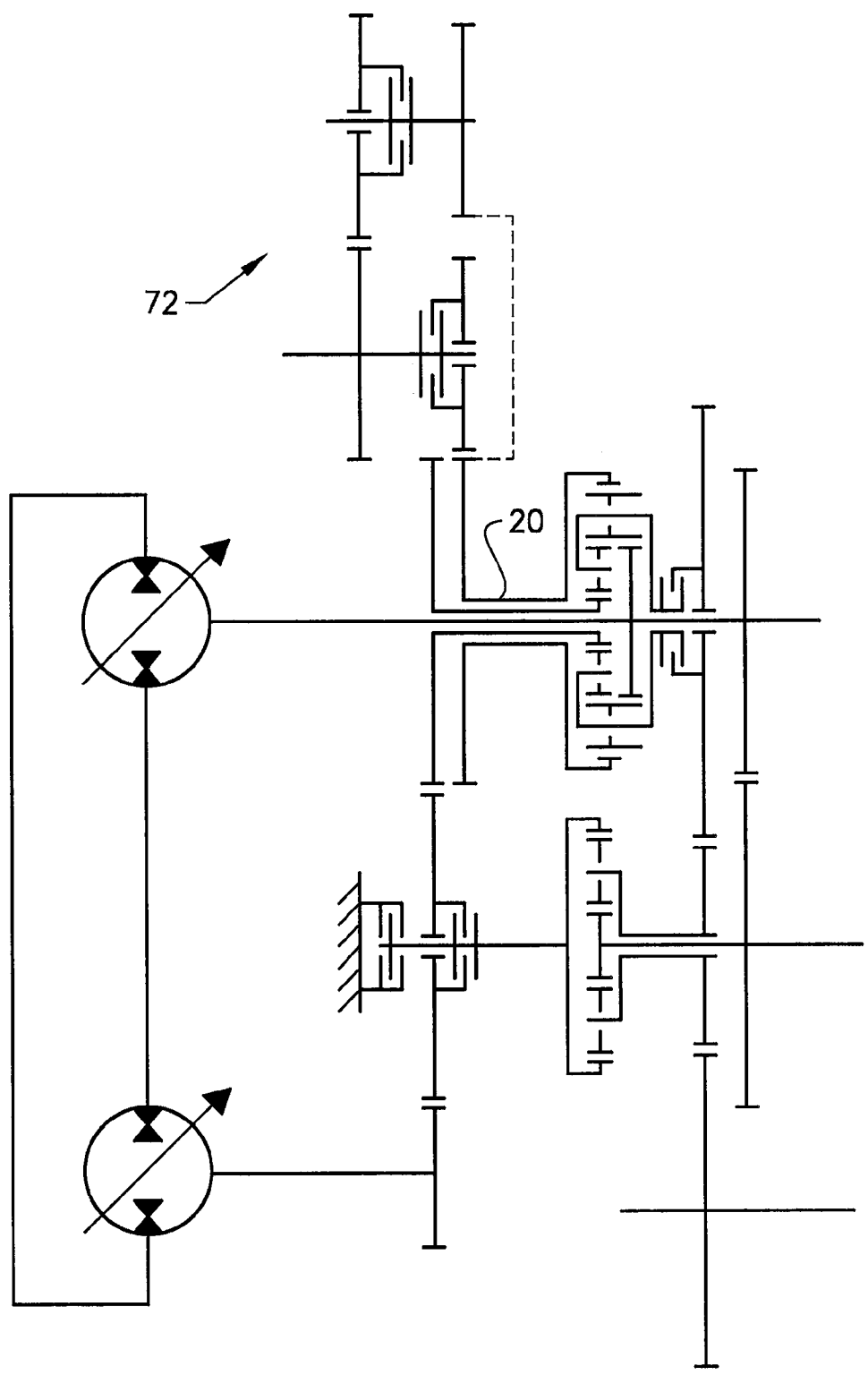

FIG. 8f corresponds to the embodiment shown in FIG. 8e with the forward-reverse gear unit 72 connected to the transmission input shaft 20.

In the embodiments shown in FIGS. 8a-8f, the second clutch unit 32 is directly coupled to the common output shaft 22, while in the embodiment shown in FIG. 6 the second clutch 32 is arranged on a separate shaft. The arrangement of the second clutch unit on the common output shaft enables a compact design, while the arrangement of the second clutch unit on a separate shaft facilitates provision of hydraulic oil to the clutch unit.

Figure 9:
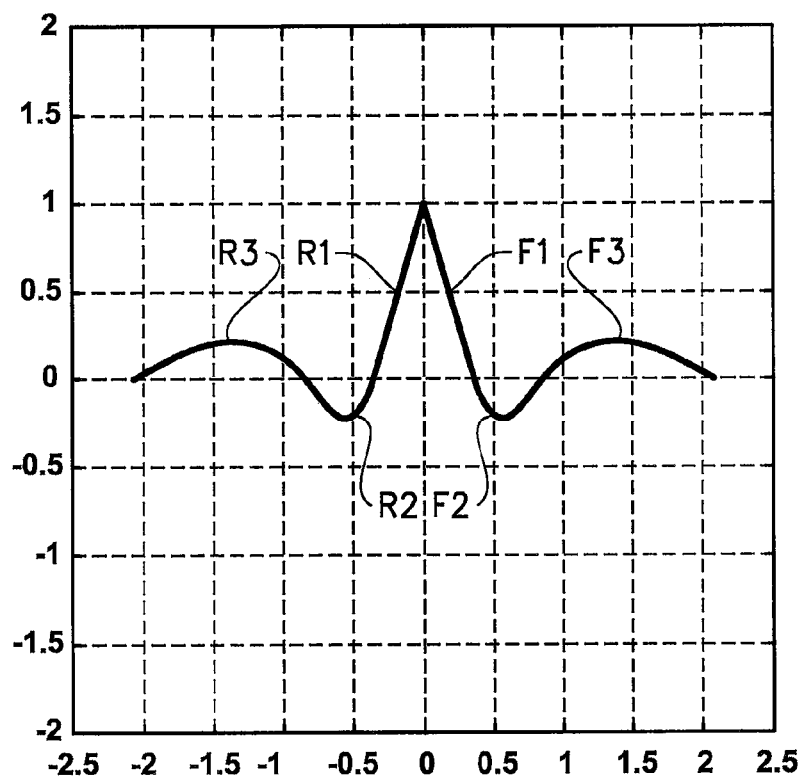
FIG. 9 shows a variator power ratio as a function of overall speed ratio for a first, second and third forward and reverse mode.

FIG. 9 shows the variator power ratio $P_{variator}/P_{total}$ as a function of overall speed ratio $i_{total}$ for a first, second and third forward and reverse mode. The mode changes appear at variator power ratio of 0. The respective modes are marked F1, F2, F3, R1, R2 and R3 respectively.

Figure 10:
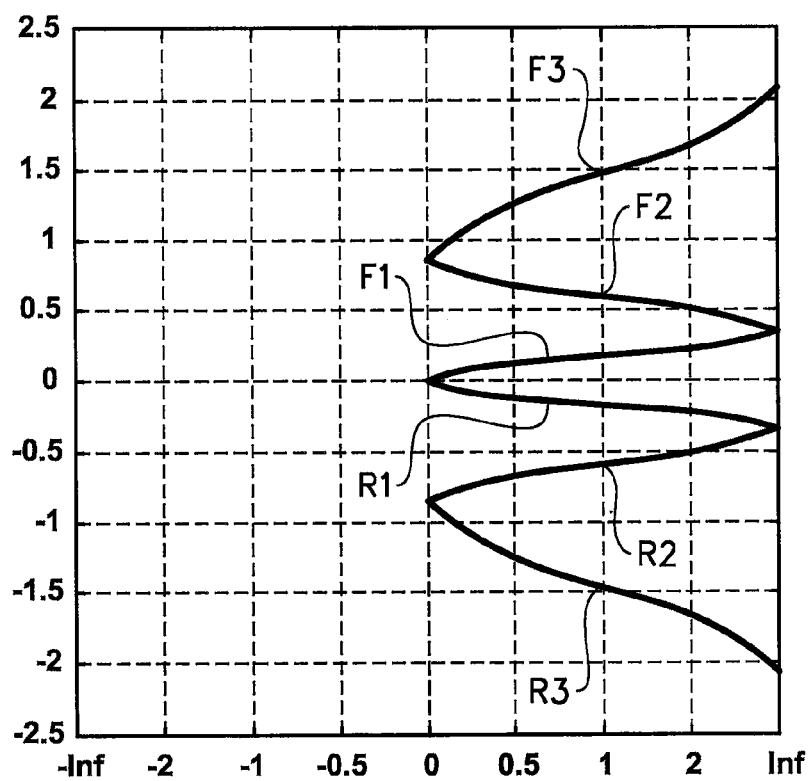
FIG. 10 shows overall speed ratio as a function of variator speed ratio for a first, second and third forward and reverse mode.

FIG. 10 shows overall speed ratio $i_{total}$ as a function of variator speed ratio for a first, second and third forward and reverse mode. The mode changes appear at variator speed ratio of 0 or infinity. The respective modes are marked F1, F2, F3, R1, R2 and R3 respectively.

Figure 11:
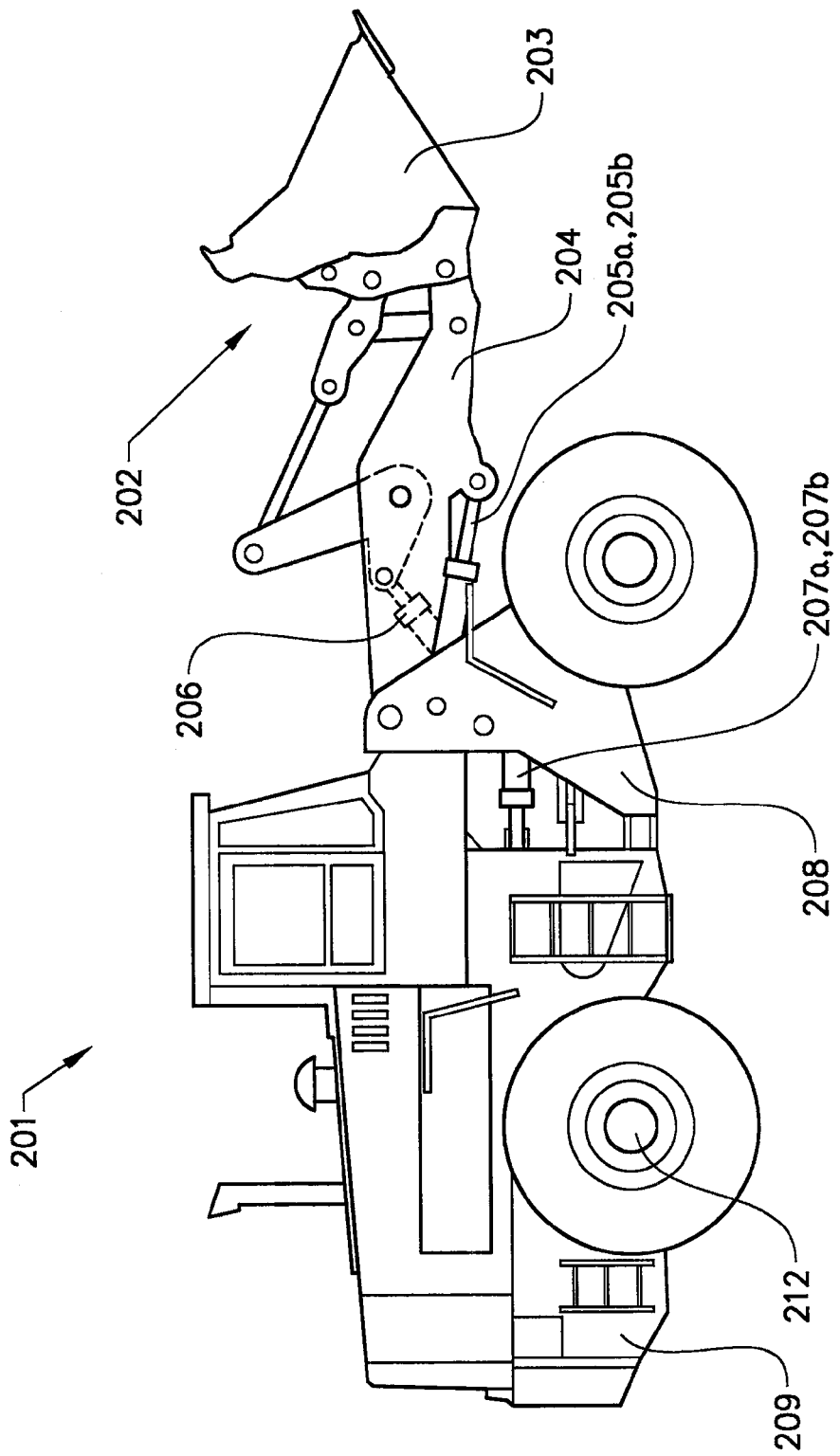
FIG. 11 is a lateral view illustrating a wheel loader having a bucket for loading operations, and a hydraulic system for operating the bucket and steering, the wheel loader.

FIG. 11 is an illustration of a working machine 201 in the form of a wheel loader having an implement 202. The term "implement" is intended to comprise any kind of tool using hydraulics, such as a bucket, a fork or a gripping tool arranged on a wheel loader, or a container arranged on an articulated hauler. The implement illustrated comprises a bucket 203 which is arranged on an arm unit 204 for lifting and lowering the bucket 203, and further the bucket 203 can be tilted or pivoted relative to the arm unit 204. The wheel loader 201 is provided with a hydraulic system comprising at least one hydraulic machine (not shown in FIG. 11). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 202. In the example embodiment illustrated in FIG. 1 the hydraulic system comprises two hydraulic cylinders 205a, 205b for the operation of the arm unit 204 and a hydraulic cylinder 206 for tilting the bucket 203 relative to the arm unit 204. Furthermore the hydraulic system comprises two hydraulic cylinders 207a, 207b arranged on opposite sides of the wheel loader for turning the wheel loader by means of relative movement of a front body part 208 and a rear body part 209. In other words; the working machine is frame-steered by means of the steering cylinders 207a, 207b.

Figure 12:
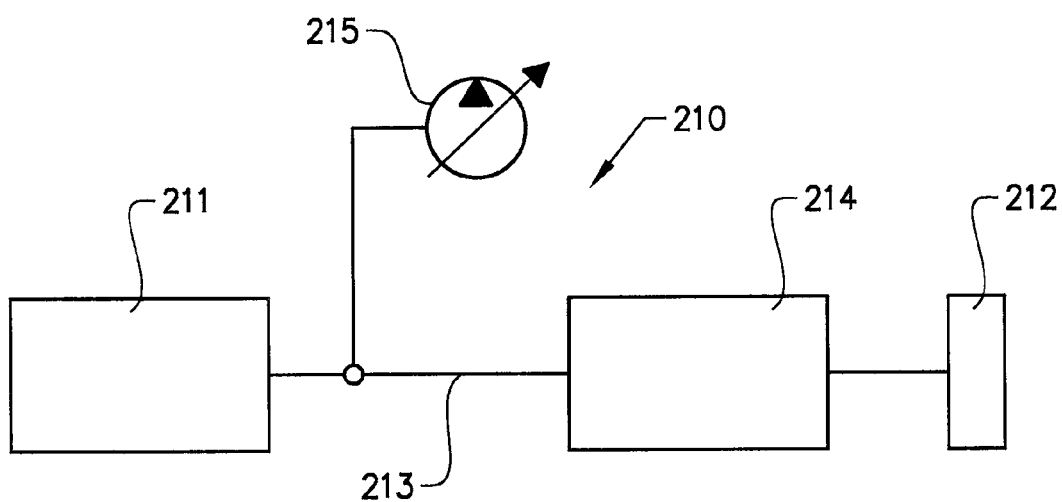
FIG. 12 is a schematic illustration of a drive train of the working machine illustrated in FIG. 11.

FIG. 12 is a schematic illustration of a drive train 210 of the working machine 201 illustrated in FIG. 1 The drive train 210 comprises a prime mover 211 for supplying power to the driving wheels 212 of the working machine, and a transmission line 213 arranged between the prime mover 211 and the driving wheels 212 for transmitting power from the prime mover 211 to the driving wheels 212. The driving wheels 212 are schematically illustrated in FIG. 12. However, any number of wheels and wheel axles can be used in the working machine according to the invention. For example, there can be one front axle and one rear axle as illustrated in FIG. 11 and some or all of the wheels can be driven wheels. Although the prime mover 211 is preferably an internal combustion engine (ICE), for example a diesel engine, other prime movers such as for example Sterling engines can also be used. The transmission 213 comprises a transmission 214 including a continuously variable transmission 1 according to the invention, and the forward-reverse gear unit 72. The transmission 214 is arranged between the prime mover 211 and the driving wheels 212.

In FIG. 12 said at least one hydraulic machine 215 for moving, the implement 202 arranged on the working machine 201 and/or for steering the working machine 201 is schematically illustrated. The working machine can be equipped with one or more hydraulic machines for providing the hydraulic fluid required.

Figure 14:
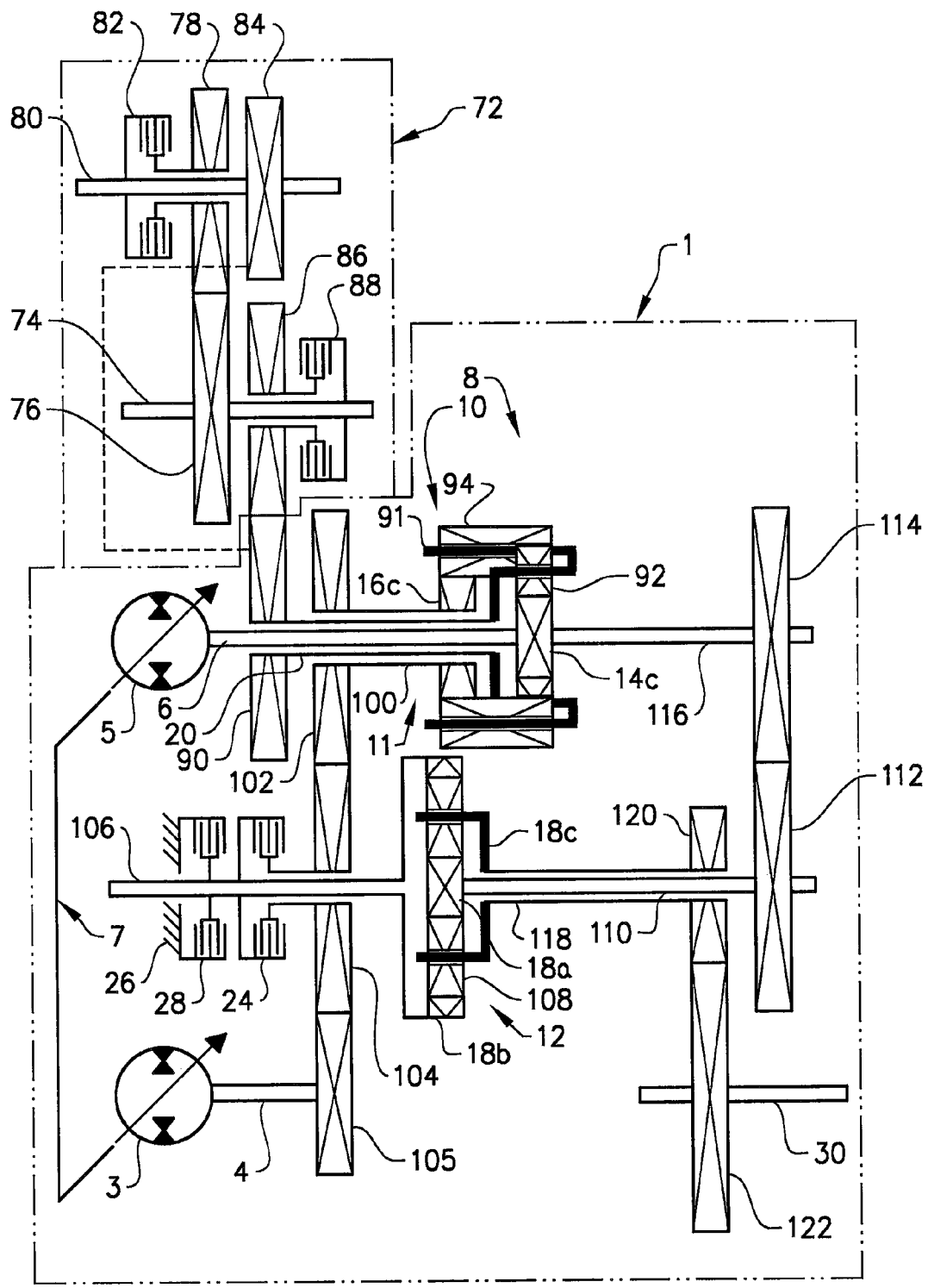
FIG. 14 shows a specific embodiment of the continuously variable transmission shown in FIG. 13.

The transmissions of the type shown in FIGS. 3 and 14 generally relates to a continuously variable transmission including a variator unit having a variator input shaft and a variator output shaft, and first, second and third planetary gear sets. The first and second planetary gear sets are arranged together and including each a first member being operatively connected to a common transmission input shaft, and a third member.

The third planetary gear set includes a first, second and third member.

Furthermore the variator input shaft is operatively connected to a third member of the second planetary gear set and the variator output shaft is operatively connected to the third member of the first planetary gear set. The first member of said third planetary gear set is operatively connected to said variator output shaft. The second member of the third planetary gear set is selectively connectable to the third member of the second planetary gear set and selectively connectable to the transmission housing. The third member of the third planetary gear set is operatively connected to a transmission output shaft.

The continuously variable transmission is operable in two operating modes by engagement or disengagement of a first clutch unit and by release or locking up of the second member of the third planetary gear set to a transmission housing by a locking unit.

By the design of the continuously variable transmission, the third planetary gear set is operable in a first operating mode as a reduction gear enabling a large gear ratio over the third planetary gear set, and in a second mode as a merging device, when power is distributed over the third members of the first and second planetary gear sets to the third planetary gear set in one branch going to the first member and another branch going to the second member of the third planetary gear set.

The use of the third planetary gear set both as a reduction gear and for merging power from two branches enables compact design of the transmission without inclusion of sets of gear stages with large gear ratios.

in one embodiment, as shown in the FIG. 14, the first and second planetary gear sets are designed as a reduced Ravigneaux gear train.

Figure 13:
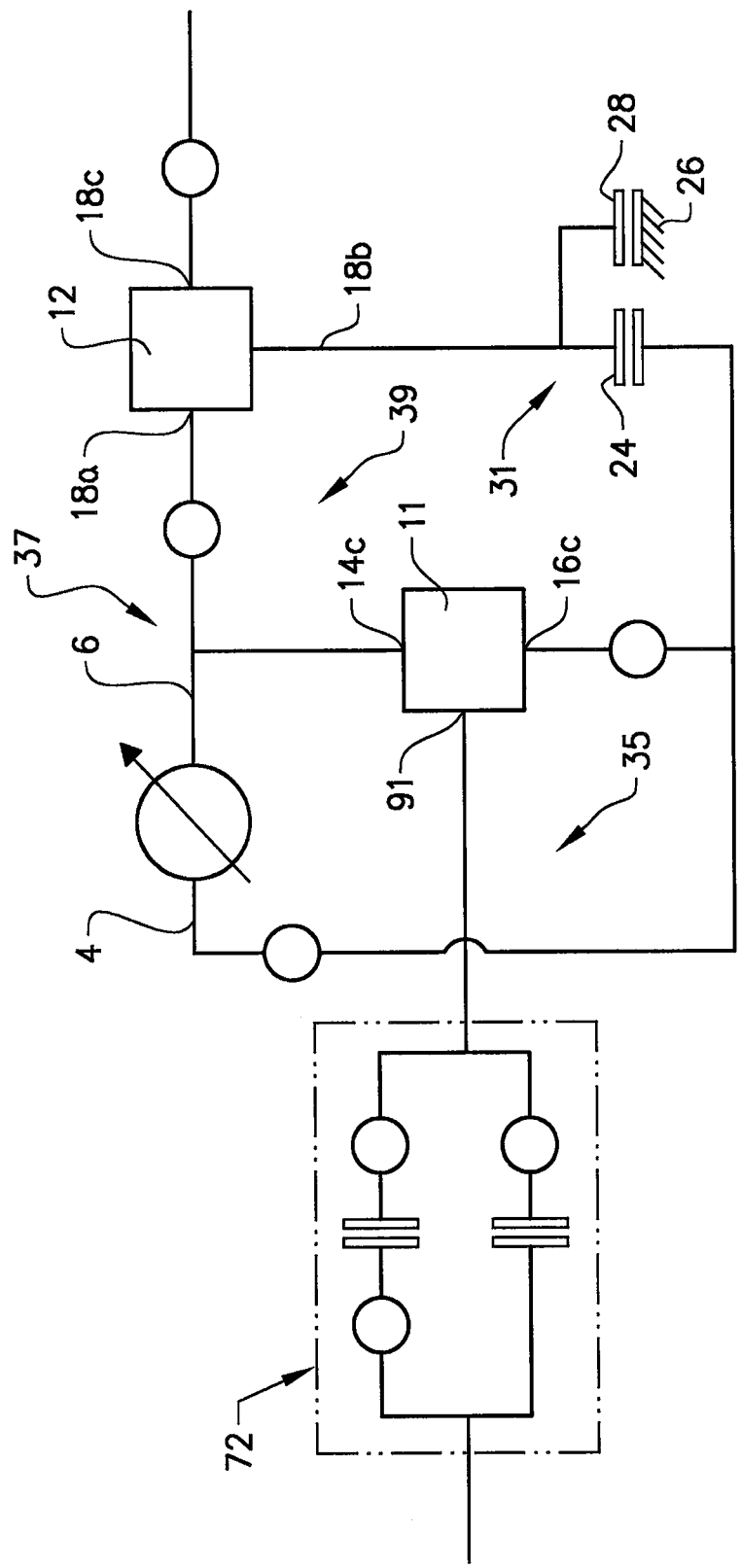
FIG. 13 shows a continuously variable transmission being operable in two different modes.

FIG. 13 shows a variable transmission being operable in two different modes. In the figure a forward-reverse gear unit 72 is connected to a common carrier 91 of a reduced Ravigneaux planetary gear train 11. A reduced Ravigneaux planetary gear train is a Ravigneaux gear train lacking a common ring gear. The reduced Ravigneaux gear train includes a large and a small sun gear 16c, 14c, and a common carrier 91 with sets of inner and of outer planet gears 92, 94 connected thereto. The set of inner planet gears 92 meshes with the small sun gear 14c and the set of outer planet gears 94 meshes with the large sun gear 16c. The inner and outer planet gears 92,94 are in meshing engagement with each other.

The small sun gear 14c connected to a sun gear 18a of the third planetary gear set 12 in a fourth branch 39. The large sun gear 16c is connected to a ring gear 18b of the third planetary gear set 12 in a first branch 31. The large sun gear 16c is connected to a variator input shaft 4 in a second branch 35. A variator output shaft 6 is connected to the small sun gear 14c in a third branch 37. Gear stages may be included in the first, second and fourth branches as shown in FIG. 13, but may also be included in the third branch. The continuously variable transmission is operable in a first and second mode by engagement or disengagement of a first clutch unit 24 and by release or locking up of the ring gear 18b of the third planetary gear set 12 to a transmission housing 26 by a locking unit 28.

FIG. 14 shows a specific embodiment of the continuously variable transmission shown in FIG. 13.

To the continuously variable transmission 1 is a forward-reverse gear unit 72 added to the transmission input shaft 20. The forward-reverse gear unit 72 includes an input shaft 74 having a first gear wheel 76 being, in engagement with a second gear wheel 78 releasably connected to a mid shaft 80 by a forward clutch 82. The mid shaft 80 carries a third gearwheel 84. A fourth gear wheel 86 is releasably connected to the input shaft 74 by a reverse clutch 88. When the forward clutch is engaged, the reverse clutch is disengaged and vice versa. The third and fourth gear wheels 84, 86 both engage with an input gear wheel 90 attached to the transmission input shaft 20. The transmission input shaft 20 is connected to a common planet carrier 91 of the first and second planetary gear sets 8, 10 which are arranged as a Ravigneaux planetary gear train 11.

The planetary gear train is of reduced Ravigneaux type. The planetary gear train including a large and a small sun gear 16c, 14c, and a common carrier 91 with sets of inner and of outer planet gears 92, 94 connected thereto. The set of inner planet gears 92 meshes with the small sun gear 14c and the set of outer planet gears 94 meshes with the large sun gear 16c. The inner and outer planet gears 92, 94 are in meshing engagement with each other.

The small sun gear 4c of the first planetary gear set. 8 is connected to a variator output shaft 6 which is arranged concentrically within the transmission input shaft 20, which is hollow. The large sun gear 16c of the second planetary gear set 10 is connected via a hollow shaft 100 concentrically arranged around the transmission input shaft 20 to a gear wheel 102. The gear wheel 102 is connected to a gear wheel 104 releasably arranged, on a mid shaft 106 via a first clutch 24. A locking unit 28 is arranged to selectively lock the mid shaft 106 to the transmission housing 26. The gear wheel 104 meshes with a gear wheel 105 connected to the variator input shaft 4 which is connected to a first hydraulic machine 3 included in the variator. The first hydraulic machine 3 is hydraulically connected to a second hydraulic machine 5 connected to the variator output shaft 6. The mid shaft 106 is furthermore connected to the ring gear 18b of a third planetary gear set 12. The ring gear 18b meshes with planet gears 08, which in turn meshes with a sun gear 18a of the third planetary gear set 12. The sun gear 18a of the third planetary gear set 12 is connected to a shaft 110 which carries a gear wheel 112 which meshes with a gear wheel 114 arranged on a shaft 116 connected to the still gear 14c of the first planetary gear set 8. The planet carrier 18c of the third planetary gear set 12 is attached to a hollow shaft 118 being concentric with the shaft 110 connected to the sun gear 18a. The hollow shaft 118 carries a gear wheel 120 which meshes with a gear wheel 122 on the transmission output shaft 30.

The embodiment shown in FIG. 14 thus generally relates to a continuously variable transmission 1 including a variator unit 2 having a variator input shaft 4 and a variator output shaft 6, and first, second and third planetary gear sets 8, 10, 12, wherein said first and second planetary gear sets 8, 10 being arranged together and including a large and a small sun gear 16c, 14c, a common planet carrier 91 with sets of inner and of outer planet gears 92,94 connected thereto, the set of inner planet gears 92 meshes with the small sun gear 14c and the set of outer planet gears 94 meshes with the large sun gear 16c, and the inner and outer planet gears 92,94 are in meshing engagement with each other. Furthermore, the third planetary gear set 12 having a first, second and third member 18a, 18b, 18c.

The variator input shaft 4 is operatively connected to the large sun gear 16c and the variator output shaft 6 is operatively connected to the small sun gear 14c. The first member 18a of said third planetary gear set 12 is operatively connected to the variator output shaft 6. The second member 18b of the third planetary gear set 12 is selectively connectable to the large sun gear 16c and selectively connectable to the transmission housing 26. The third member 18c of the third planetary gear set 12 is operatively connected to the transmission output shaft 30.

The invention claimed is:

1. A continuously variable transmission including a variator unit having a variator input shaft and a variator output shaft, and a first, a second and a third planetary gear set,
wherein each of the first and second planetary gear sets has a first member being operatively connected to a transmission input shaft which transmission input shaft is common to the first and second gear sets and a second member being operatively connected to an output shaft which output shaft is common to the first and second gear sets, each of the first and second planetary gear sets further including a third member, and the third planetary gear set having a first, a second and a third member,
wherein the variator input shaft is operatively connected to the third member of the second planetary gear set and the variator output shaft is operatively connected to the third member of the first planetary gear set, the first member of the third planetary gear set is operatively connected to the variator output shaft, the second member of the third planetary gear set is selectively connectable to the third member of the second planetary gear set and selectively connectable to a transmission housing, the third member of the third planetary gear set is operatively connected to a transmission output shaft and the common output shaft is selectively connectable to the transmission output shaft.

2. A continuously variable transmission according to claim 1, wherein the transmission includes a locking mechanism arranged to selectively lock the second member of the third planetary gear set to a transmission housing and release the second member of the third planetary, gear set from the transmission housing.

3. A continuously variable transmission according to claim 1, wherein a clutch is arranged in between the second member of the third planetary gear set and the third member of the second planetary gear set.

4. A continuously variable transmission according to claim 1, wherein a clutch is arranged in between the common output shaft and the transmission output shaft.

5. A continuously variable transmission according to claim 1, wherein the first, second and third members of the third planetary gear set are in the mentioned order constituted by a sun gear, a ring gear and a planet carrier.

6. A continuously variable transmission according to claim 1, wherein the first, second and third members of the first planetary gear set are in the mentioned order constituted by a ring gear, a planet carrier and a sun gear, and the first, second and third members of the second planetary gear set are in the mentioned order constituted by a planet carrier, a ring gear and a sun gear.

7. A continuously variable transmission according to claim 1, wherein the first members of the first and second planetary gear sets are constituted by a planet carrier which planet carrier is common to the first and second gear sets and the second members of the first and second planetary gear sets are constituted by a ring gear which ring gear is common to the first and second gear sets and the third members of the first and second planetary gear sets are constituted by a first sun gear and a second sun gear, respectively.

8. A continuously variable transmission according to claim 1, wherein the first members of the first and second planetary gear sets are constituted by a ring gear which ring gear is common to the first and second gear sets and the second members of the first and second planetary gear sets are constituted by a planet carrier which planet carrier is common to the first and second gear sets and the third members of the first and second planetary gear sets are constituted by a first sun gear and a second sun gear, respectively.

9. A continuously variable transmission according to a claim 1, wherein a mode selection arrangement is provided which enables different operating modes with different bands of continuously variable speed ratios between the common transmission input shaft and the transmission output shaft.

10. A continuously variable transmission according to claim 9, wherein the mode selection arrangement includes a locking mechanism arranged to selectively lock to and release the second member of the third planetary gear set relative to a transmission housing, a first clutch arranged in between the second member of the third planetary gear set and the third member of the second planetary gear set, a second clutch arranged in between the common output shaft and the transmission output shaft, a set of actuators arranged to control engagement and disengagement of the first and second clutch and arranged to control release of the locking mechanism from the transmission housing and locking of the locking mechanism to the transmission housing, respectively.

11. A continuously variable transmission according to claim 10, wherein the mode selection arrangement includes a controller arranged for operating the set of actuators.

12. A continuously variable transmission according to claim 11, wherein the controller enables selective operation of the continuously variable transmission in a first operating mode where the locking mechanism is locked and the first and second clutches are disengaged, in a second operating mode where the locking mechanism is released, the first clutch is engaged and the second clutch is disengaged, and in a third operating mode where the locking mechanism is released, the first clutch is disengaged and the second clutch is engaged.

13. A continuously variable transmission according to claim 1, wherein a gear stage is included in between the common output shaft and the transmission output shaft.

14. A continuously variable transmission according to claim 1, wherein the variator unit has a first hydraulic machine provided with the input shaft of the variator unit and a second hydraulic machine provided with the output shaft of the variator unit, the first and second hydraulic machines being hydraulically connected to each other.

15. A continuously variable transmission according to claim 14, wherein the variator unit is controlled by a dual yoke enabling simultaneous control of the first and second hydraulic machines via a single actuator.

16. A continuously variable transmission according to claim 1, wherein the variator unit has a first electric machine provided with the input shaft of the variator unit and a second electric machine provided with the output shaft of the variator unit, the first and second electric machines being electrically connected to each other.

17. A continuously variable transmission including a variator unit having a variator input shaft and a variator output shaft, and first, second and third planetary gear sets, wherein each of the first and second planetary gear sets has a first member being operatively connected to a transmission input shaft which transmission input shaft is common to the first and second gear sets, and a third member, the third planetary gear set having a first, a second and a third member, wherein the variator input shaft is operatively connected to a third member of the second planetary gear set and the variator output shaft is operatively connected to the third member of the first planetary gear set, the first member of the third planetary gear set is operatively connected to the variator output shaft, the second member of the third planetary gear set is selectively connectable to third member of the second planetary gear set and selectively connectable to a transmission housing, and the third member of the third planetary gear set is operatively connected to a transmission output shaft.

18. A continuously variable transmission according to claim 17, wherein the first and second planetary gear sets are arranged as a reduced Ravigneaux gear train including a small and a large sun gear constituting the third members of the first and second planetary gear sets, and a carrier which is common to the first and second planetary gear sets and constitutes the first members of the first and second planetary gear sets, the carrier being provided with sets of inner and of outer planet gears, the set of inner planet gears being in meshing engagement with the small sun gear and the set of outer planet gears being in meshing engagement with the large sun gear, the inner and outer planet gears being in meshing engagement with each other.

19. A continuously variable transmission according to claim 18, wherein the variator input shaft is operatively connected to the large sun gear and the variator output shaft is operatively connected to the small sun gear, the second member of the third planetary gear set is selectively connectable to the large sun gear and selectively connectable to the transmission housing.

20. A working machine comprising a continuously variable transmission according to claim 1.

* * * * *